(12) United States Patent
Fujii et al.

(10) Patent No.: US 12,461,637 B2
(45) Date of Patent: Nov. 4, 2025

(54) INFORMATION PROCESSING SYSTEM, INFORMATION PROCESSING METHOD, AND NON-TRANSITORY COMPUTER READABLE MEDIUM

(71) Applicant: FUJIFILM Business Innovation Corp., Tokyo (JP)

(72) Inventors: Toshihide Fujii, Yokohama (JP); Tatsuyuki Esaki, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 449 days.

(21) Appl. No.: 17/870,469

(22) Filed: Jul. 21, 2022

(65) Prior Publication Data

US 2023/0251751 A1    Aug. 10, 2023

(30) Foreign Application Priority Data

Feb. 8, 2022    (JP) ................ 2022-018248

(51) Int. Cl.
     *G06F 3/0481*      (2022.01)
     *G06F 40/106*      (2020.01)

(52) U.S. Cl.
     CPC .......... *G06F 3/0481* (2013.01); *G06F 40/106* (2020.01)

(58) Field of Classification Search
     CPC ................. G06F 3/0481; G06F 40/106; G06F 2203/04803; G06F 2203/04806; G06F 3/04817; G06F 3/0483; G06F 3/0482; G06F 3/04847
     See application file for complete search history.

(56) References Cited

U.S. PATENT DOCUMENTS

| 10,222,954 | B2 | 3/2019 | Aoyama | |
| 2015/0363053 | A1* | 12/2015 | Aoyama | G16H 30/40 715/838 |

FOREIGN PATENT DOCUMENTS

| JP | 2008-077210 A | 4/2008 |
| JP | 2014-104099 A | 6/2014 |
| JP | 2014104099 | * 6/2014 |

OTHER PUBLICATIONS

Jun. 22, 2023 Extended Search Report issued in European Patent Application No. 22193042.3.

* cited by examiner

*Primary Examiner* — Cao H Nguyen
(74) *Attorney, Agent, or Firm* — Oliff PLC

(57) ABSTRACT

An information processing system includes a processor configured to: cause a display to display an enlarged image corresponding to a file image in a case where the file image displayed on the display and serving as an image corresponding to a first file is selected by a user, the enlarged image having a display size larger than a display size of the file image; acquire file information about a second file that is different from the first file and that is specified in accordance with a searching process performed by the user in a state where the enlarged image is displayed on the display; and cause the display to display a corresponding image corresponding to the second file and the enlarged image in a state where the corresponding image and the enlarged image have a predetermined positional relationship, the corresponding image having a display size larger than the display size of the file image.

20 Claims, 15 Drawing Sheets

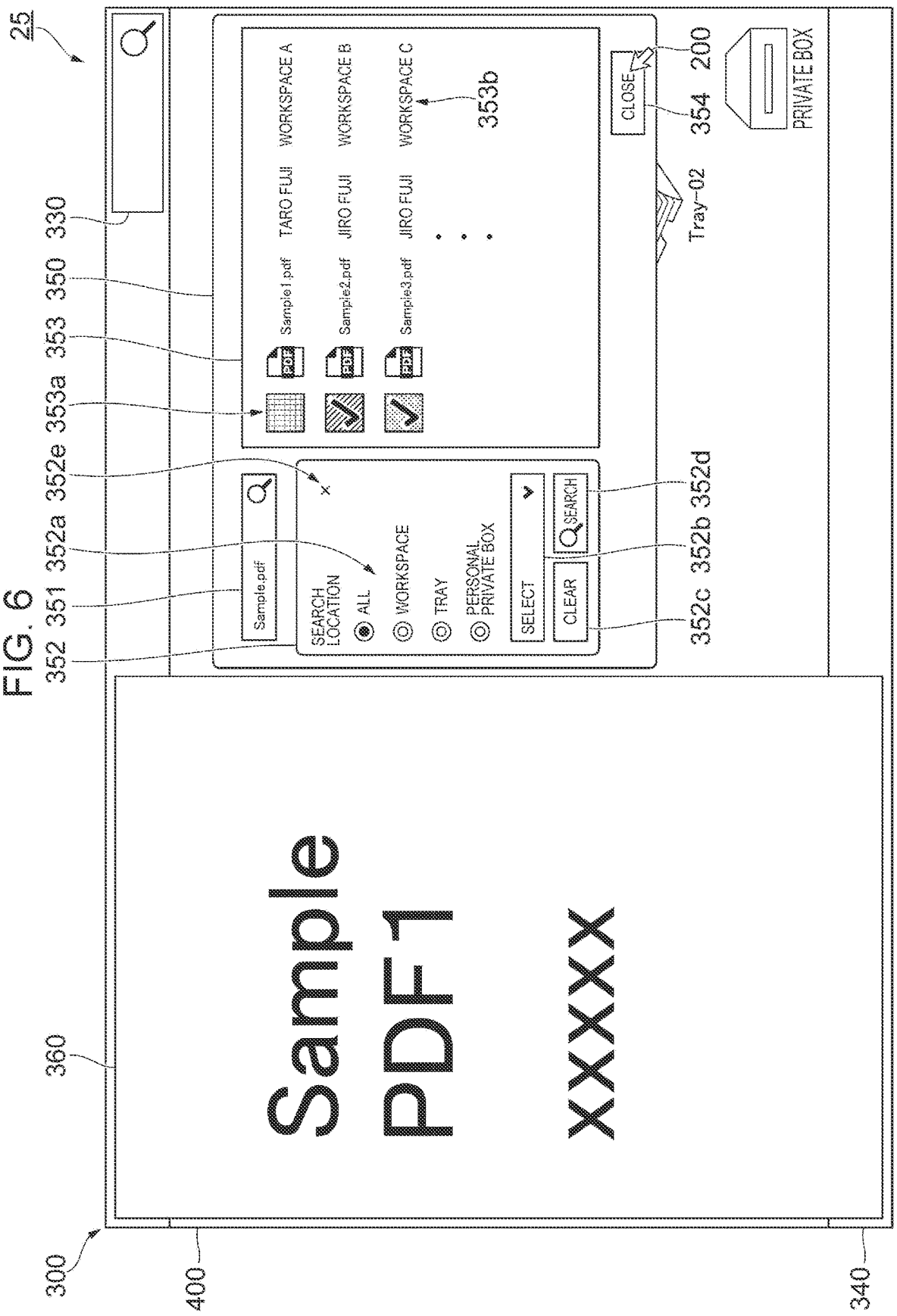

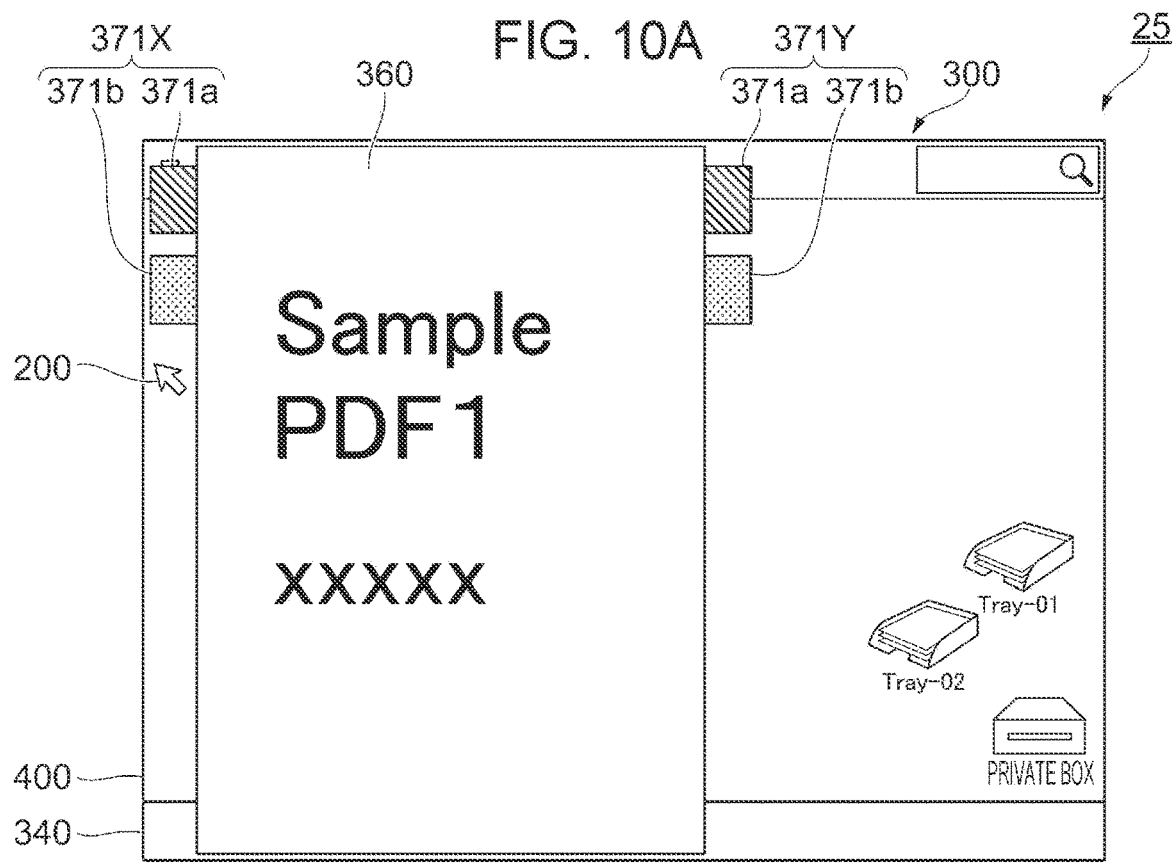
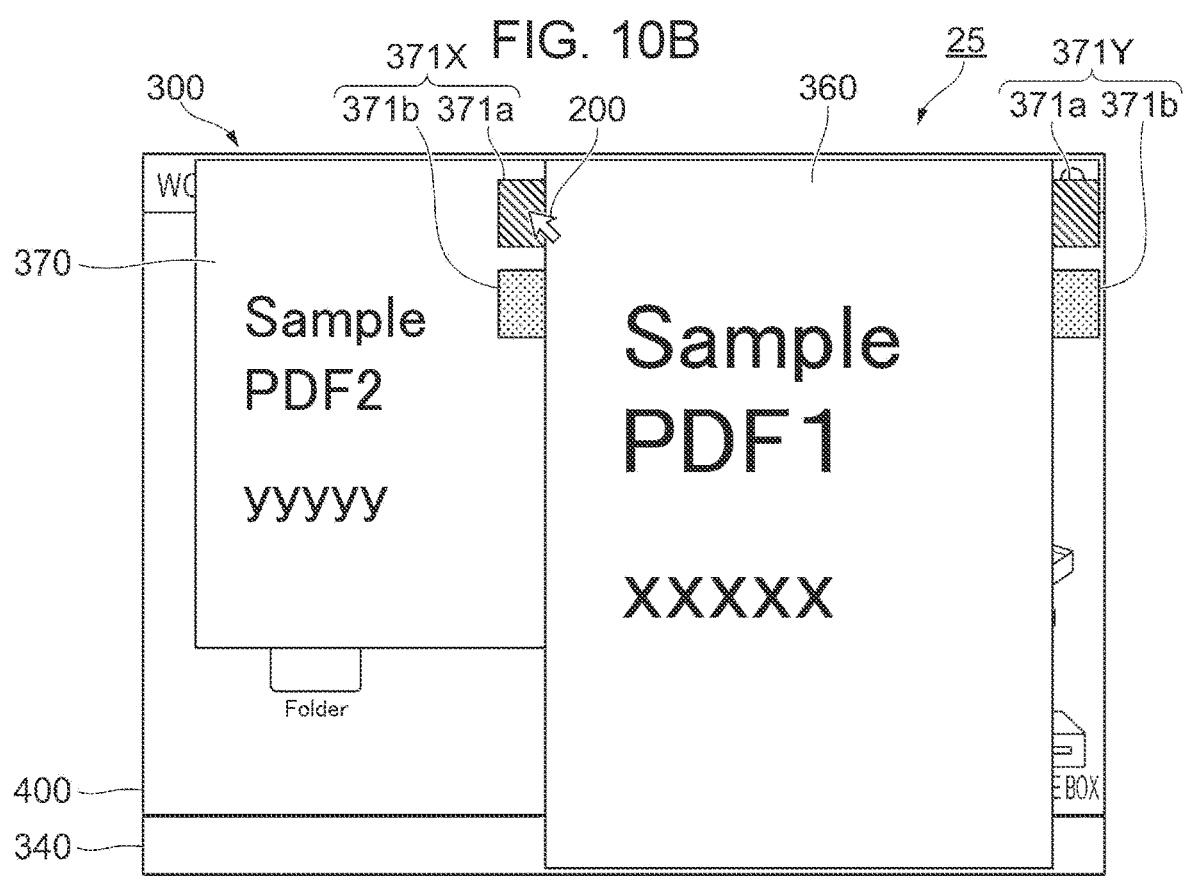

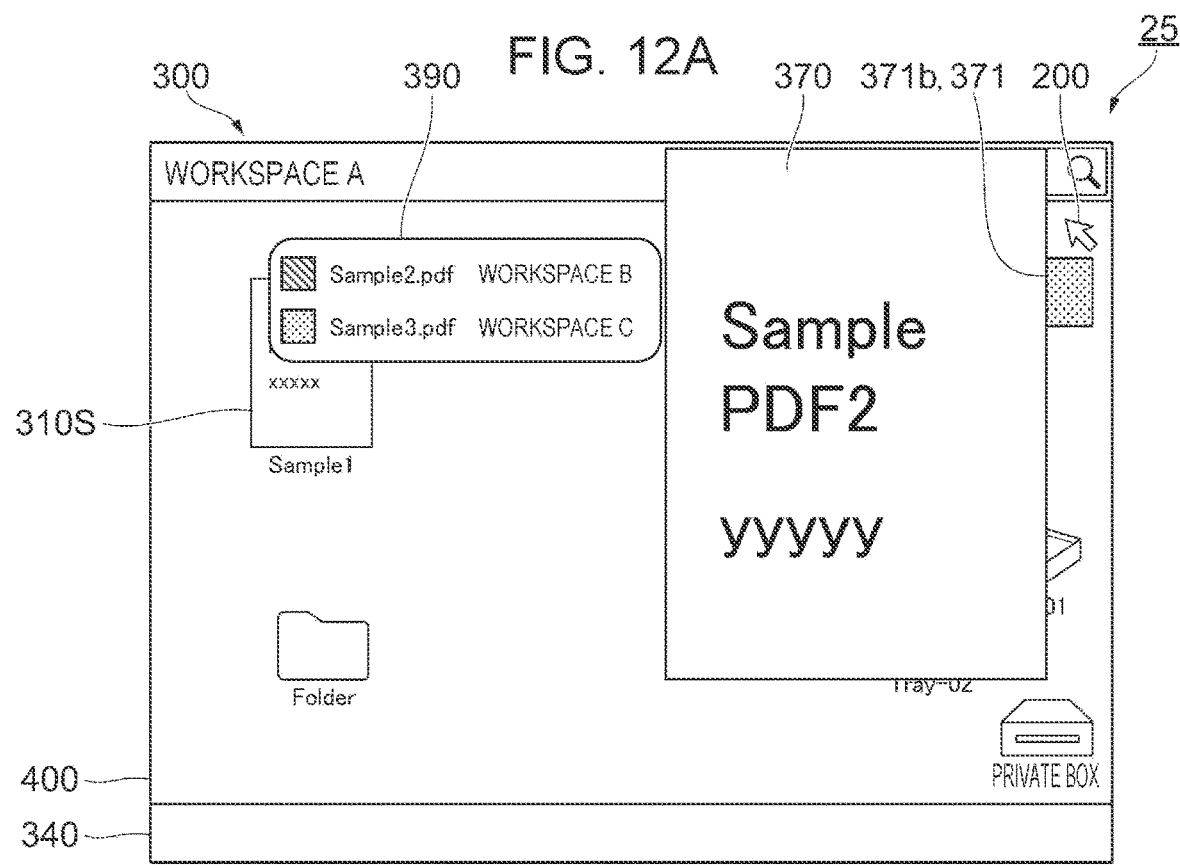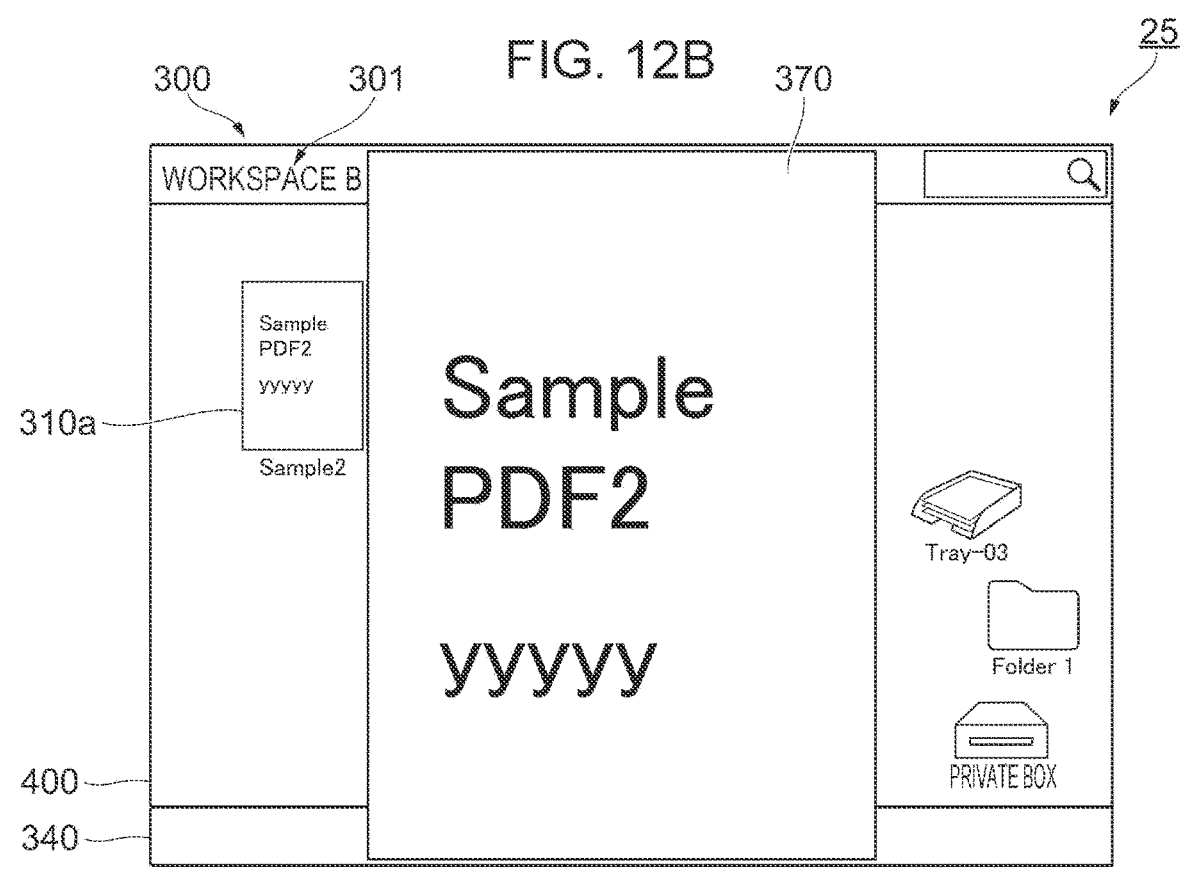

INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-018248 filed Feb. 8, 2022.

BACKGROUND

(i) Technical Field

The present disclosure relates to information processing systems, information processing methods, and non-transitory computer readable media.

(ii) Related Art

In Japanese Unexamined Patent Application Publication No. 2008-77210, an operation performed by a user on a screen that displays an image based on document data and a thumbnail image of the document data is recognized as operation information, a display condition when the image is to be displayed on the screen is set based on the recognized operation information on the thumbnail image, and the image is enlarged and displayed in accordance with the set display condition.

SUMMARY

The user may sometimes select multiple files and compare the selected files with each other. When performing this comparison, it is assumable that a file that the user desires to compare may be not displayed on a display during the comparison. There may also be a file that the user remembers its existence but does not remember its storage location.

Aspects of non-limiting embodiments of the present disclosure relate to an ability to compare a file not displayed on a display with another file different from the aforementioned file.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to: cause a display to display an enlarged image corresponding to a file image in a case where the file image displayed on the display and serving as an image corresponding to a first file is selected by a user, the enlarged image having a display size larger than a display size of the file image; acquire file information about a second file that is different from the first file and that is specified in accordance with a searching process performed by the user in a state where the enlarged image is displayed on the display; and cause the display to display a corresponding image corresponding to the second file and the enlarged image in a state where the corresponding image and the enlarged image have a predetermined positional relationship, the corresponding image having a display size larger than the display size of the file image.

BRIEF DESCRIPTION OF THE DRAWINGS

Exemplary embodiments of the present disclosure will be described in detail based on the following figures, wherein:

FIG. 6 illustrates an example of a search screen according to this exemplary embodiment;

FIGS. 10A and 10B illustrate other examples of the correspondence command images, FIG. 10A illustrating a case where any of the correspondence command images is selected by the user, FIG. 10B illustrating a case where a correspondence command image included in a first set of images is selected by the user;

FIGS. 12A and 12B illustrate a display example of information indicating a storage destination of a second file, FIG. 12A illustrating a case where a presentation screen is displayed, FIG. 12B illustrating a case of switching to a workspace where the second file is stored;

DETAILED DESCRIPTION

Exemplary embodiments of the present disclosure will be described in detail below with reference to the appended drawings.

Overall Configuration of Information Processing System 1

Figure 1:
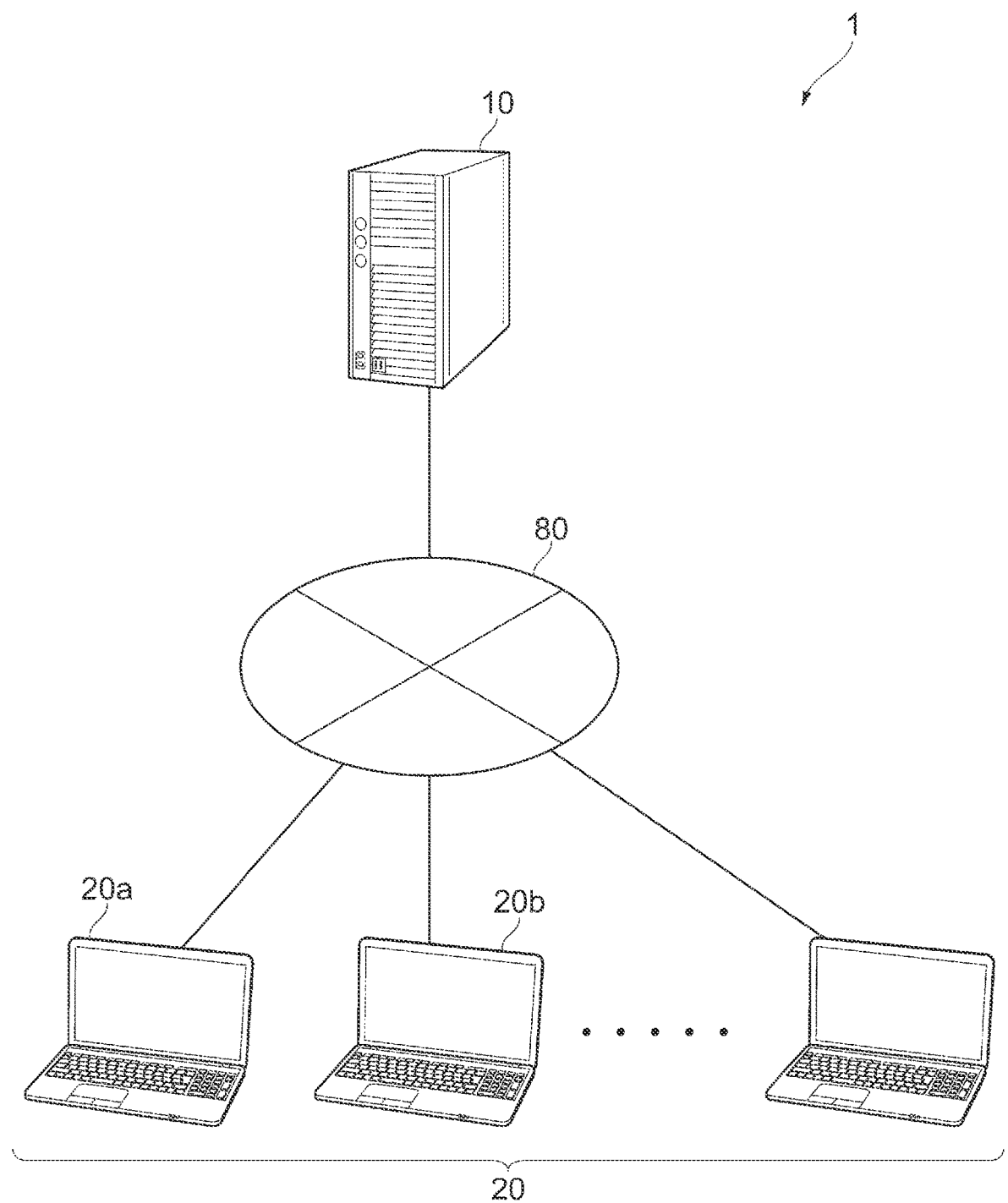
FIG. 1 illustrates an overall configuration example of an information processing system according to an exemplary embodiment.

FIG. 1 illustrates an overall configuration example of an information processing system 1 according to an exemplary embodiment. The information processing system 1 according to this exemplary embodiment is configured by connecting a server apparatus 10, which manages files, and terminal apparatuses 20 (20a, 20b, and so on), which are used by users for browsing files, to each other via a communication line 80.

The communication line 80 is, for example, the Internet and is used for information communication between the server apparatus 10 and the terminal apparatuses 20. In the information processing system 1 according to this exemplary embodiment, a file uploaded to the server apparatus 10 is to be browsed or edited in each terminal apparatus 20.

In this exemplary embodiment, the term "file" refers to an electronic file stored in, for example, the server apparatus 10. The file may include an image in addition to text, or may include an image alone without including text.

In addition to document data and/or image data, file information about the file may contain image information to be used when converting document data into an image, as well as attribute information, such as the update time of the electronic file, the sheet size, the number of pages, and a keyword within the electronic file.

An example of the file may be an electronic document. Examples of a storage location of the electronic document include a tray to be used by a user for exchanging the electronic document with a third party, a folder to be used for storing the electronic document, and a private box to be used for storing the electronic document shared with the user by the third party.

The server apparatus 10 manages files uploaded from the terminal apparatuses 20. Each file to be managed by the server apparatus 10 is shared by multiple users and may be edited by one or more users. The server apparatus 10 is realized by, for example, a computer. The server apparatus 10 may be configured by a single computer, or may be implemented in accordance with distributed processing by multiple computers.

Each terminal apparatus 20 is used for browsing or editing the files managed by the server apparatus 10. The terminal apparatus 20 has a display that displays an image corresponding to a file. The terminal apparatus 20 has a function for displaying an image for browsing multiple files in accordance with an operation performed by the user. The terminal apparatus 20 may be realized by, for example, a computer, a tablet information terminal, a smartphone, or another information processing apparatus.

Next, a hardware configuration of the server apparatus 10 will be described.

Figure 2:
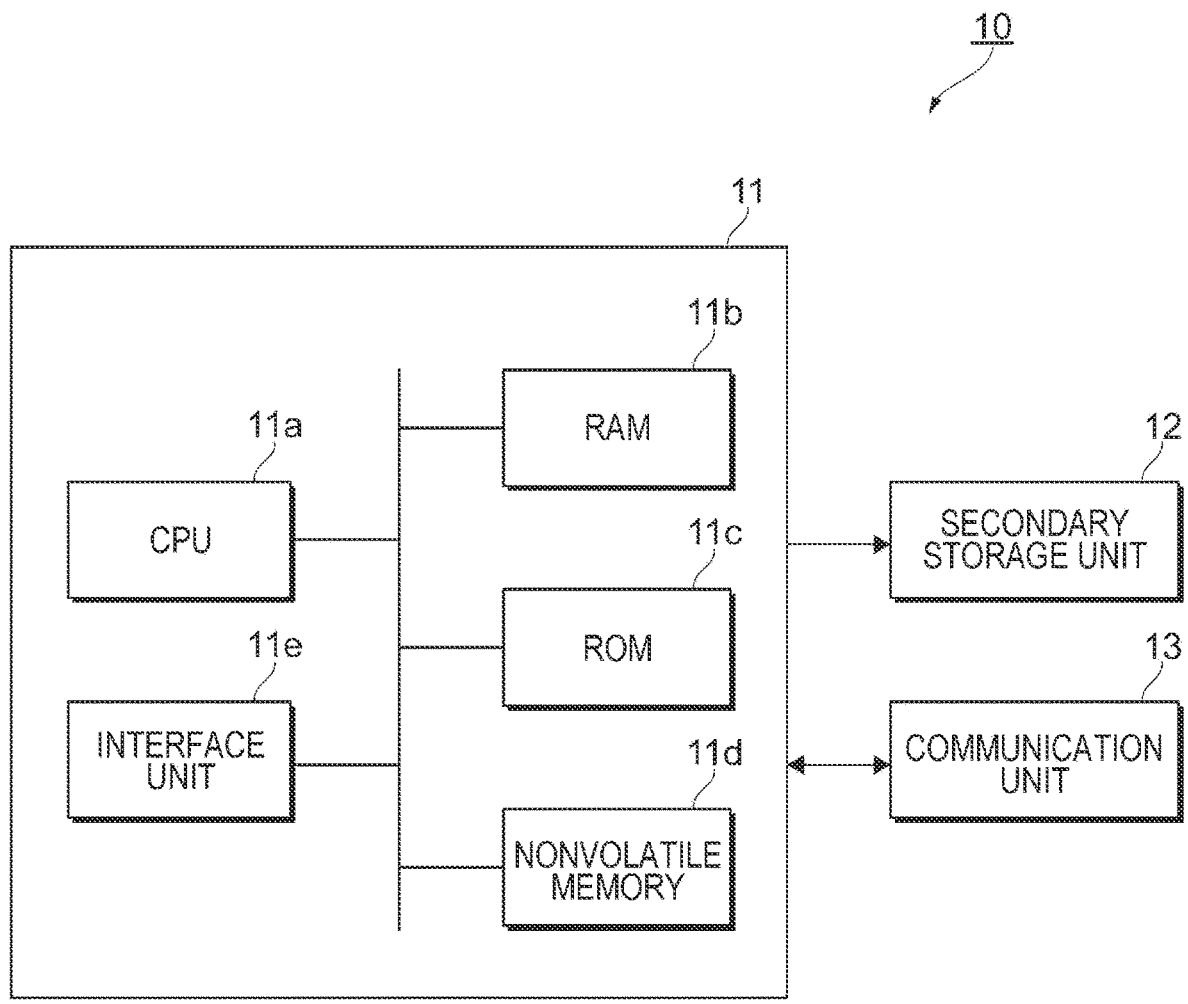
FIG. 2 is a block diagram illustrating an example of a hardware configuration of a server apparatus according to this exemplary embodiment.

FIG. 2 is a block diagram illustrating an example of the hardware configuration of the server apparatus 10 according to this exemplary embodiment. The server apparatus 10 according to this exemplary embodiment includes an arithmetic unit 11 that executes a digital arithmetic process in accordance with a program that implements file management, a secondary storage unit 12 that stores files, and a communication unit 13 that exchanges information via the communication line 80 (see FIG. 1).

The secondary storage unit 12 is realized by an existing information storage device, such as a hard disk drive (HDD), semiconductor memory, or magnetic tape.

The arithmetic unit 11 includes a central processing unit (CPU) 11a as an example of a processor that controls the entire apparatus, a random access memory (RAM) 11b used as a work memory of the CPU 11a, and a read-only memory (ROM) 11c that stores, for example, the program to be executed by the CPU 11a. The arithmetic unit 11 also includes a rewritable nonvolatile memory 11d capable of retaining data even when not supplied with electric power, and an interface unit 11e that controls each unit, such as the communication unit 13, connected to the arithmetic unit 11.

The nonvolatile memory 11d is constituted of, for example, a static random access memory (SRAM) or a flash memory backed up by a battery, and stores file information of each file as well as correspondence information for associating files with each other. In addition to files, the secondary storage unit 12 stores the program to be executed by the arithmetic unit 11. The arithmetic unit 11 reads the program stored in the secondary storage unit 12, so that each process of the server apparatus 10 according to this exemplary embodiment is executed. The arithmetic unit 11, the secondary storage unit 12, and the communication unit 13 are connected to one another via a bus or a signal line.

In response to a request from each terminal apparatus 20, the server apparatus 10 executes a process for acquiring a new file, a file searching process, and a process for associating files with each other. Furthermore, in response to a request from each terminal apparatus 20, the server apparatus 10 provides a file, a search result, and various types of information, such as file information, to the terminal apparatus 20.

In this exemplary embodiment, the secondary storage unit 12 stores the file, and the communication unit 13 receives the request from the terminal apparatus 20 and transmits the requested file.

Next, a hardware configuration of each terminal apparatus 20 will be described.

Figure 3:
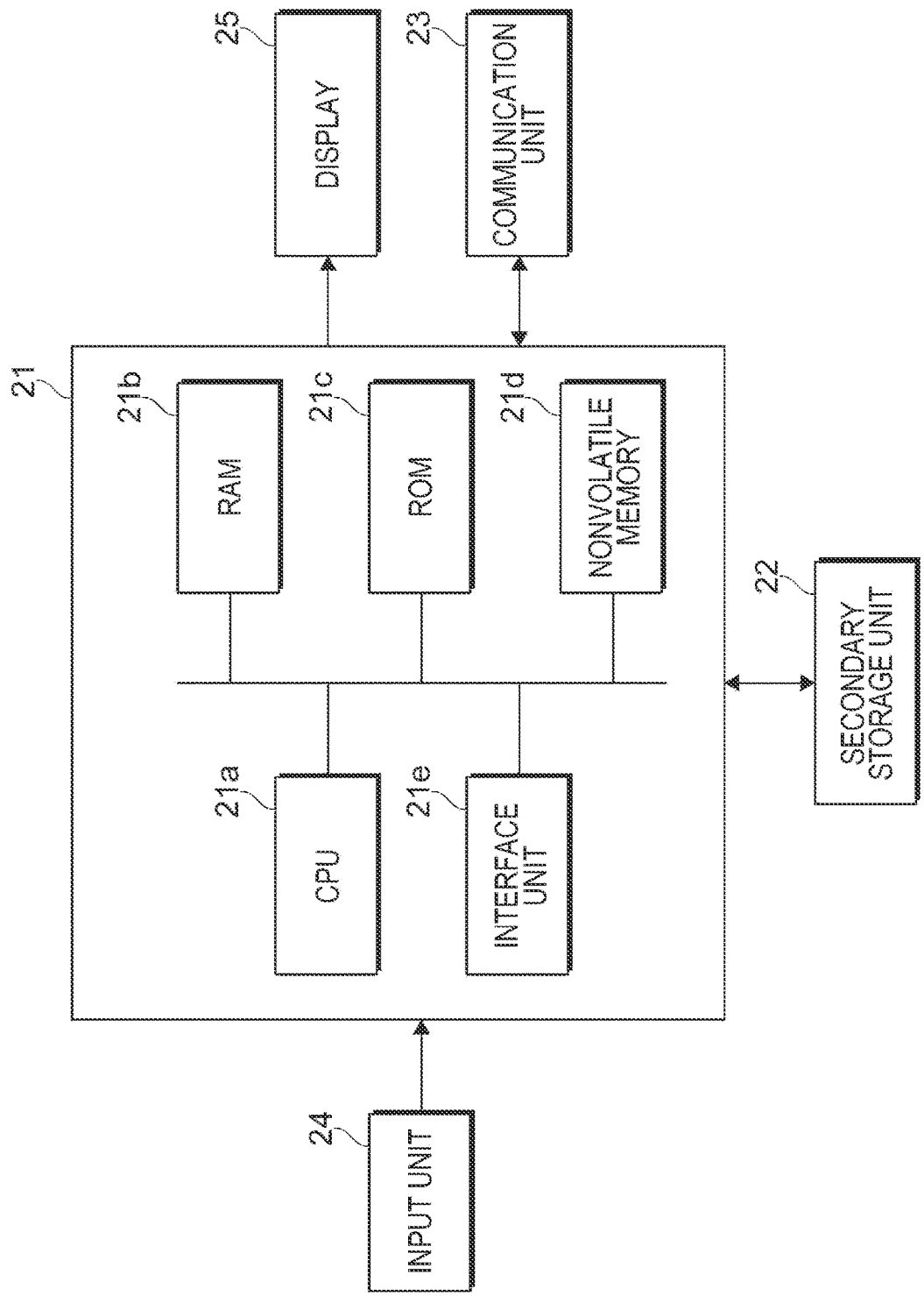
FIG. 3 is a block diagram illustrating an example of a hardware configuration of each terminal apparatus according to this exemplary embodiment.

FIG. 3 is a block diagram illustrating an example of the hardware configuration of each terminal apparatus 20 according to this exemplary embodiment. Each terminal apparatus 20 according to this exemplary embodiment includes an arithmetic unit 21 that executes an image displaying process in accordance with a program, a secondary storage unit 22 that stores files, and a communication unit 23 that exchanges information via the communication line 80 (see FIG. 1).

Furthermore, each terminal apparatus 20 is provided with an input unit 24 that receives an input operation from the user, as well as a display 25 formed of, for example, a liquid display panel or an electro-luminescence (EL) display panel that displays an image and/or text information to the user.

The secondary storage unit 22 is realized by an existing information storage device, such as a hard disk drive (HDD), semiconductor memory, or magnetic tape.

The arithmetic unit 21 includes a CPU 21a as an example of a processor that controls the entire apparatus, a RAM 21b used as a work memory of the CPU 21a, and a ROM 21c that stores, for example, the program to be executed by the CPU 21a. The arithmetic unit 21 also includes a rewritable nonvolatile memory 21*d* capable of retaining data even when not supplied with electric power, and an interface unit 21*e* that controls each unit, such as the communication unit 23, connected to the arithmetic unit 21.

The nonvolatile memory 21*d* is constituted of, for example, a SRAM or a flash memory backed up by a battery, and stores a search result and file information. In addition to files, the secondary storage unit 22 stores the program to be executed by the arithmetic unit 21. The arithmetic unit 21 reads the program stored in the secondary storage unit 22, so that each process of the terminal apparatus 20 according to this exemplary embodiment is executed. The arithmetic unit 21, the secondary storage unit 22, and the communication unit 23 are connected to one another via a bus or a signal line.

The input unit 24 is, for example, a pointing device used by the user for performing an input operation.

For example, if the input unit 24 is a mouse device, the user may move a cursor or perform a clicking operation to designate a position on a display screen displayed on the display 25 or designate an image displayed on the display 25.

If the input unit 24 is a touchscreen, the user may touch the touchscreen with a finger or maintain the finger in a touched state longer than a predetermined time period, so as to designate a position on the display screen displayed on the display 25 or designate an image displayed on the display 25. In this case, the input unit 24 is integrated with the display 25.

In addition to the pointing device mentioned above, the input unit 24 may include a keyboard used for performing a key input operation.

Display on Display 25

Figure 4:
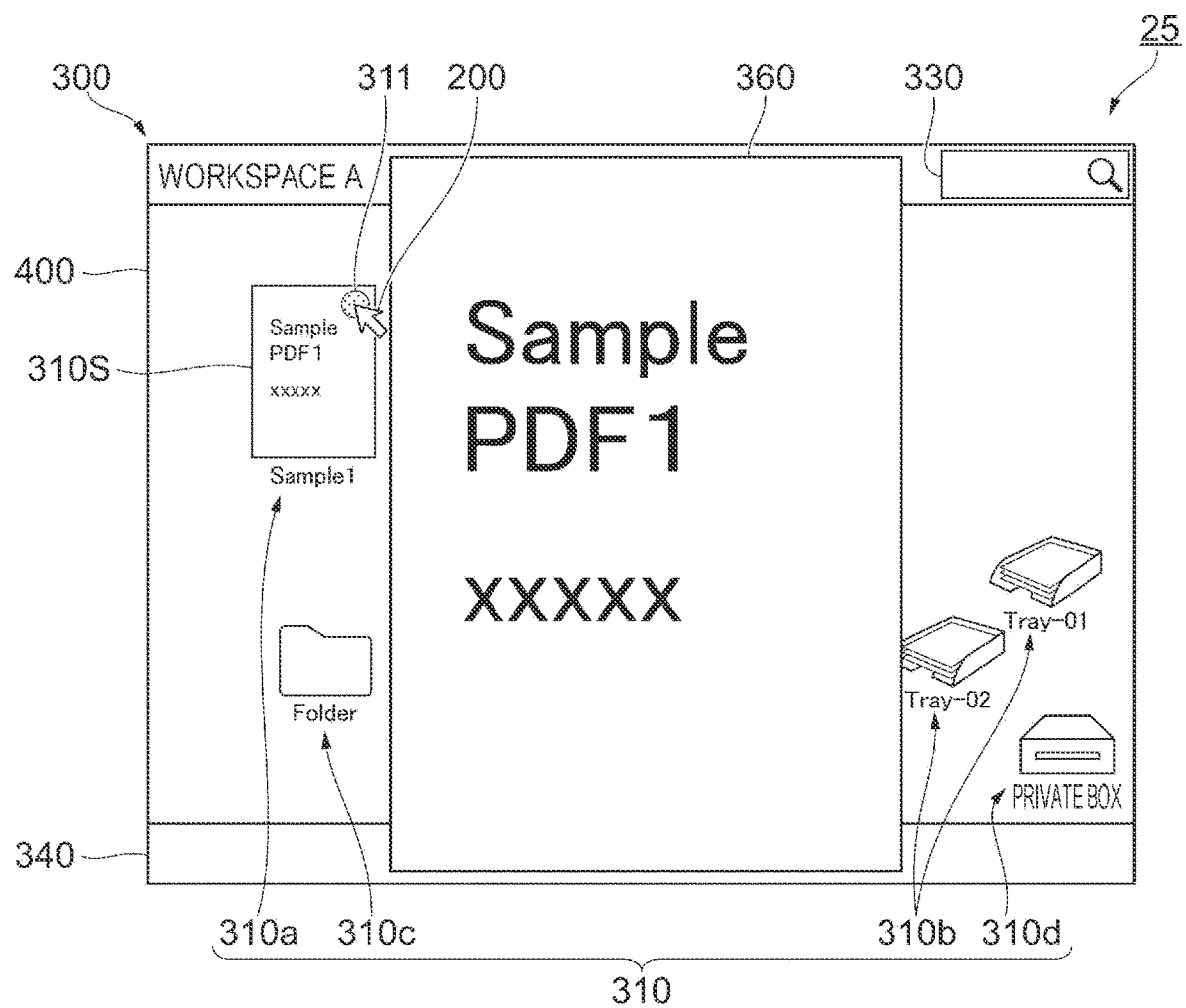
FIG. 4 illustrates an example of an operation screen according to this exemplary embodiment.

The following description relates to display on the display 25 with reference to FIG. 4.

FIG. 4 illustrates an example of an operation screen 300 according to this exemplary embodiment.

In this exemplary embodiment, the display 25 provided in the terminal apparatus 20 displays the operation screen 300 that displays a region of at least a part of a workspace 400 of so-called file handling software and that serves as a screen for receiving an operation performed by the user.

This file handling software digitizes and manages document data and has a function for facilitating unified management of paper and electronic data.

The workspace 400 may have an area larger than a region to be displayed on one screen without performing scrolling on the operation screen 300. The workspace 400 is a region where icons 310, to be described later, are arranged. The area of the workspace 400 may be changed in accordance with the arrangement of the icons 310. As the workspace 400, for example, another independent workspace 400 different from a "workspace A" may be provided.

The display 25 according to this exemplary embodiment may display a cursor 200 indicating a position or an image on the operation screen 300. The cursor 200 moves in accordance with an input operation performed by the user via the input unit 24, and is displayed to indicate a user-designated position or image on the screen.

In addition to the icons 310, the operation screen 300 displays, for example, an enlargement command image 311, a search window 330, a tool bar 340, and an enlarged image 360.

The search window 330 is an image that receives a so-called global search and receives a text-based searching operation targeted to all files within the workspace 400 displayed on the operation screen 300.

The tool bar 340 is a group of indicators prepared for simplifying an operation to be performed by the user on a file displayed on the operation screen 300. Examples of the operation to be performed on a file include an operation for saving the file, an operation for printing the file, an operation for rotating the file, an operation for searching for the file, an operation for encrypting the file, and an operation for binding two or more electronic documents together.

The icons 310 indicate various types of functions, such as a program function, by using graphic symbols. Each icon 310 is displayed on the operation screen 300 of the display 25 and is an image corresponding to a file or the storage location of the file. The image receives a user command given to the file or the storage location of the file. Examples of the icons 310 include a document icon 310*a* corresponding to a document having a document name "Sample 1", tray icons 310*b* corresponding to respective trays having tray names "Tray-01" and "Tray-02", a folder icon 310*c* having a folder name "Folder", and a private-box icon 310*d*. The document icon 310*a*, the tray icons 310*b*, the folder icon 310*c*, and the private-box icon 310*d* will be referred to as the icons 310 if they are not to be differentiated from one another.

The document icon 310*a* is a file image corresponding to an electronic document. The document icon 310*a* may indicate the electronic document by using a graphic symbol or may be a thumbnail image for checking at least some of the contents of the document. For example, if the corresponding file is image data, the thumbnail image is displayed as an image obtained by simply reducing the original image. If the corresponding file is document data having multiple pages, the thumbnail image is displayed as an image obtained by reducing a representative page, such as the first page. The document icon 310*a* displayed as the thumbnail image functions as an icon for opening the corresponding file.

Although not shown in the drawings, if the document corresponding to the thumbnail image has multiple pages, an image indicating that the multiple pages are bound together or an image for receiving a change of the displayed page from the user may be displayed in association with the document icon 310*a*. In this exemplary embodiment, the term "page" refers to a group of data to be displayed at one time as a single page on the operation screen 300.

Each tray icon 310*b* is an image for selecting a tray to be used by the user for exchanging an electronic document with a third party. The folder icon 310*c* is an image for selecting a folder to be used for collectively storing electronic documents or for classifying the electronic documents. The private-box icon 310*d* is an image for selecting a private box to be used for storing an electronic document shared with the user by the third party.

For example, when any one of the icons 310 is selected from the tray icons 310*b*, the folder icon 310*c*, and the private-box icon 310*d*, a screen used for selecting an electronic document stored at the storage location corresponding to the selected icon 310 is displayed.

The enlargement command image 311 is for receiving a user command related to displaying of the enlarged image 360, to be described later. The enlargement command image 311 is displayed in association with the document icon 310*a*.

In the display example shown in FIG. 4, the enlargement command image 311 is for receiving a user command for displaying the enlarged image 360 corresponding to the document having the document name "Sample1".

Based on an operation performed by the user on the enlargement command image 311, the enlargement command image 311 receives a "command for temporarily displaying the enlarged image 360" or a "command for maintaining the enlarged image 360 in a displayed state". For example, a mouse-over operation performed on the enlargement command image 311 is the operation for temporarily displaying the enlarged image 360, and a clicking operation performed on the enlargement command image 311 is the operation for maintaining the enlarged image 360 in a displayed state.

In this exemplary embodiment, the enlargement command image 311 is displayed over the upper right region of the document icon 310a. In this case, the enlargement command image 311 may be displayed so as not to reduce the visibility of the document icon 310a. For example, the enlargement command image 311 is displayed smaller than the document icon 310a.

Furthermore, the enlargement command image 311 may be displayed in a semi-transparent manner such that an area of the document icon 310a that overlaps the enlargement command image 311 is transparently visible. The display of the enlargement command image 311 may be varied in correspondence with the content of a command, such as "whether to receive a user command for temporarily displaying the enlarged image 360" or "whether to receive a user command for maintaining the enlarged image 360 in a displayed state".

The enlargement command image 311 may be displayed in association with not only the document icon 310a but also an icon 310 corresponding to the storage location of an electronic document, such as the tray icon 310b, the folder icon 310c, or the private-box icon 310d. The enlargement command image 311 of the icon 310 corresponding to this storage location receives a user command related to the display of the enlarged image 360 of an electronic document stored at the corresponding storage location and serving as a representative electronic document, such as an electronic document with the most-recent saved date and time.

In this exemplary embodiment, as described above, when the user selects any of the icons 310, the enlarged image 360 is displayed and is maintained in the displayed state.

More specifically, the user performs a clicking operation on the enlargement command image 311 displayed on the icon 310. Accordingly, the enlarged image 360 is displayed and is maintained in the displayed state.

In this exemplary embodiment, the enlarged image 360 is displayed without activation of a new program.

The enlarged image 360 is obtained by enlarging an icon 310 (referred to as "selected icon 310S" hereinafter) selected by the user. In this exemplary embodiment, the display contents displayed on the selected icon 310S serving as a thumbnail image are also displayed in the enlarged image 360.

The display contents displayed in the selected icon 310S do not necessarily have to be the same as the display contents displayed in the enlarged image 360. Information linked with a file displayed in accordance with the selected icon 310S or information contained in this file may be displayed as a part of the enlarged image 360.

The enlarged image 360 is an example of an enlarged image corresponding to a file image and displayed larger in size than the file image. The selected icon 310S is an example of a file image serving as an image corresponding to a first file.

The enlarged image 360 has a display size large enough such that the contents of the file corresponding to the selected icon 310S are recognizable.

The resolution of the enlarged image 360 is not particularly limited, and may be higher than the resolution of the selected icon 310S.

The display position of the enlarged image 360 is, for example, set in accordance with the display position of the selected icon 310S.

In this exemplary embodiment, the enlarged image 360 is displayed such that it is recognizable that the enlarged image 360 is associated with the selected icon 310S. In detail, the enlarged image 360 is displayed around the selected icon 310S.

Although the enlarged image 360 is displayed such that the selected icon 310S and the enlarged image 360 do not overlap each other in the display example in FIG. 4, the display mode is not limited to this.

For example, the enlarged image 360 may be displayed in a state where a part of the selected icon 310S and the enlarged image 360 overlap each other.

Next, a menu image serving as an image for receiving an operation performed by the user on the enlarged image 360 will be described with reference to FIGS. 5A and 5B. The following example relates to a case where a menu bar 380 is displayed as the menu image.

Figure 5A:
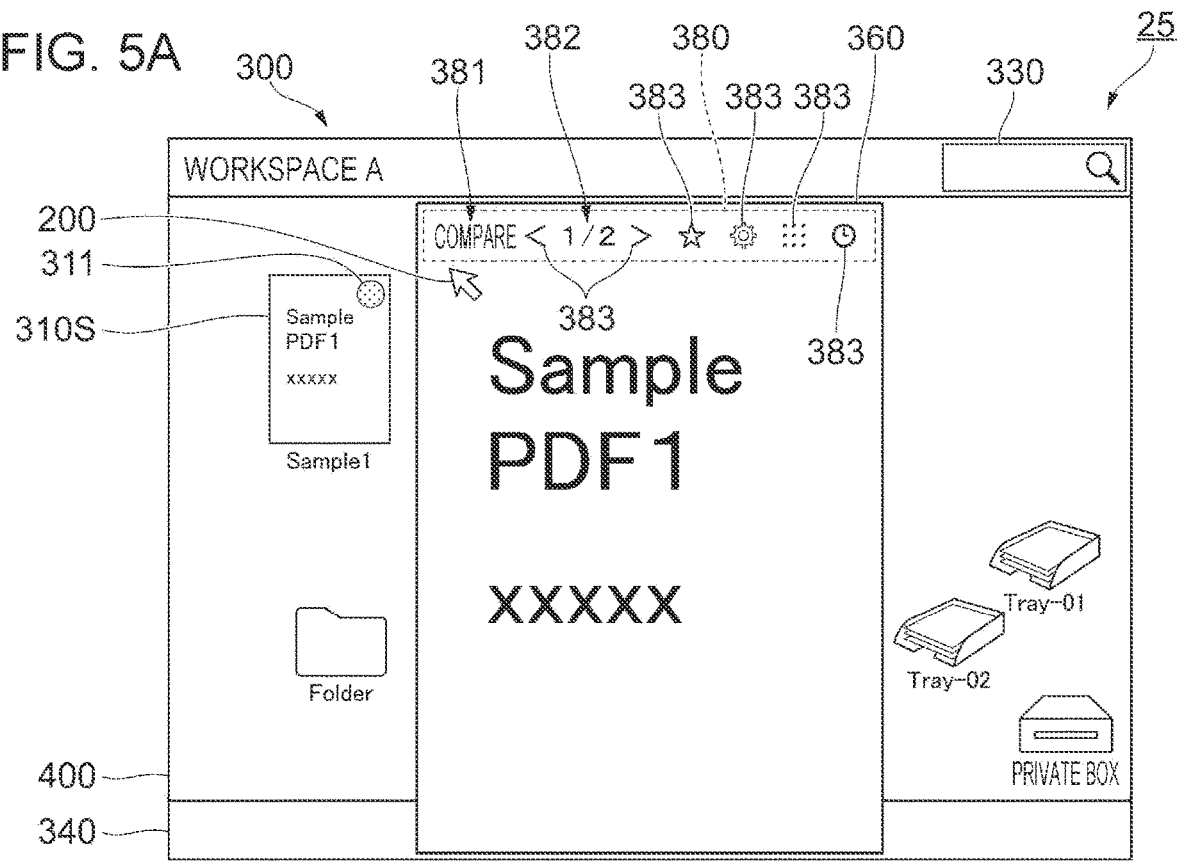
FIGS. 5A and 5B illustrate an example of a menu bar according to this exemplary embodiment, FIG. 5A illustrating a case where the menu bar is not designated by a user, FIG. 5B illustrating a case where the menu bar is designated by the user.
Figure 5B:
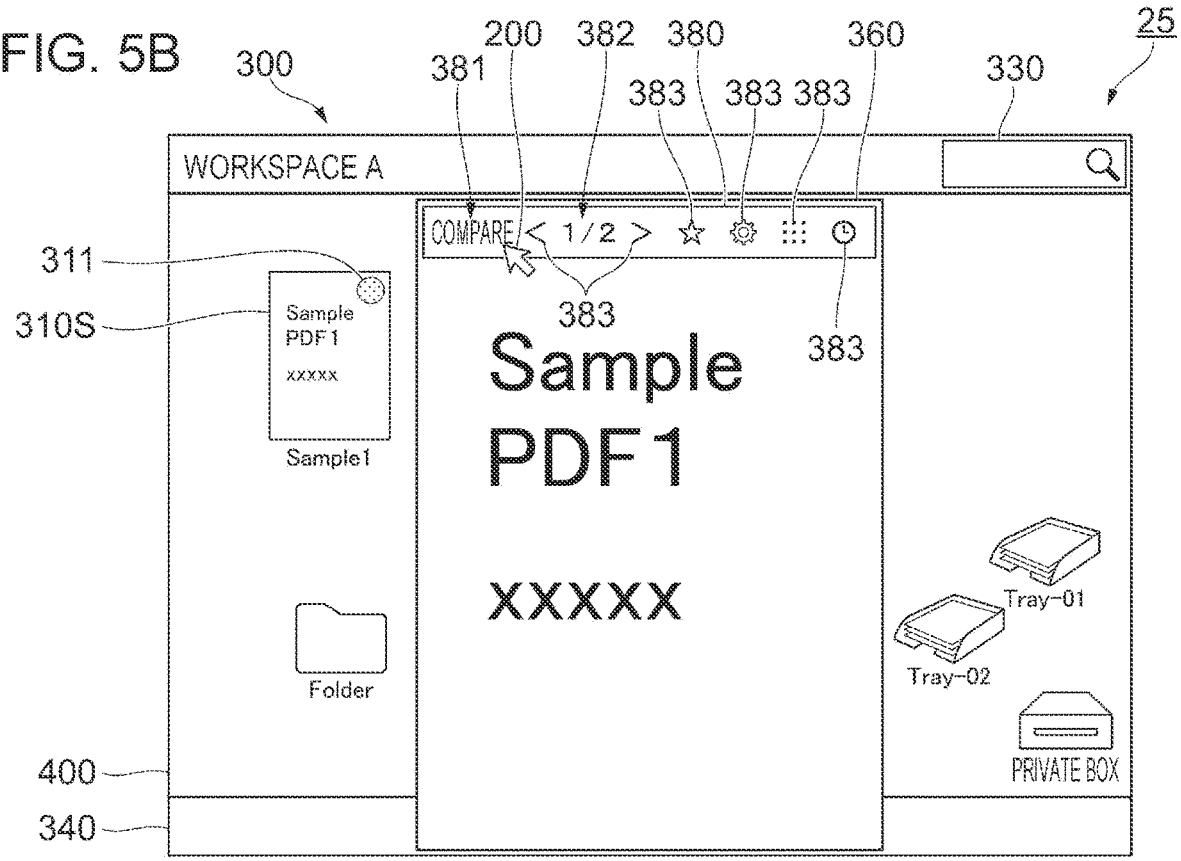

FIGS. 5A and 5B illustrate an example of the menu bar 380 according to this exemplary embodiment. Specifically, FIG. 5A illustrates a case where the menu bar 380 is not designated by the user, and FIG. 5B illustrates a case where the menu bar 380 is designated by the user.

As described above, in this exemplary embodiment, when the user selects the selected icon 310S, the enlarged image 360 is displayed on the operation screen 300.

The menu bar 380 (see FIG. 5A) according to this exemplary embodiment is an image for receiving an operation performed by the user on a file corresponding to the enlarged image 360.

In this exemplary embodiment, when the cursor 200 is positioned on the cursor 200, the menu bar 380 is displayed. In other words, the menu bar 380 is displayed when the user designates the enlarged image 360.

In the display example in FIG. 5A, the menu bar 380 is displayed where it is less likely to interfere with the visibility of the enlarged image 360 for the user. For example, the menu bar 380 is displayed in a region located in the enlarged image 360 and toward an edge of the enlarged image 360. Alternatively, the menu bar 380 may be displayed where it does not overlap with the enlarged image 360.

For example, the display position of the menu bar 380 is set in accordance with the display position of the selected icon 310S. Accordingly, the distance by which the cursor 200 is to move from the selected icon 310S to the menu bar 380 may be reduced.

The display size of the menu bar 380 is not particularly limited so long as it is large enough that menu-related button images 383 are viewable and selectable by the user. The menu bar 380 may have a display size that is less likely to interfere with the display of the enlarged image 360.

Instead of the menu bar 380 having a fixed display size and a fixed shape, the display size and the shape thereof may be changed, where appropriate, in accordance with the display size and the shape of the operation screen 300 or the enlarged image 360.

In the menu bar 380, a page display field 382 serving as a display field for the page number of a file and the button images 383 related to various types of menu options are displayed.

Examples of the button images 383 include a button image for changing the displayed page and a button image for receiving a command for executing a file editing process.

In this exemplary embodiment, the file editing process may be performed by operating the corresponding one of button images 383. In detail, for example, the editing process involves inputting text or adding a label image or a stamp image.

Another example of the button images 383 includes a button image for displaying the history of editing performed on a file. A yet another example of the button images 383 includes a button image for receiving a command from the user for enlarging the display region of the menu bar 380. By displaying more button images as the display region of the menu bar 380 is enlarged, the user may further perform other types of operations.

Additionally, the menu bar 380 may display a button image for receiving another operation, such as an operation for transmitting a document to another user.

In the display example in FIG. 5A, the cursor 200 is positioned on the enlarged image 360 but is not positioned in a region where the menu bar 380 is displayed. In other words, in the display example in FIG. 5A, the enlarged image 360 is designated by the user, but the menu bar 380 is not designated by the user.

In this state, the menu bar 380 is made semi-transparent by increasing the transparency thereof, and the enlarged image 360 is displayed such that an area thereof that overlaps the menu bar 380 is transparently visible.

Next, the display example in FIG. 5B will be described.

In the display example in FIG. 5B, the cursor 200 is positioned on the enlarged image 360 and is also positioned on the menu bar 380. In other words, in the display example in FIG. 5B, the enlarged image 360 is designated by the user, and the menu bar 380 is also designated by the user.

In this state, a process for reducing the transparency of the menu bar 380 is performed. Accordingly, the menu-related button images 383 are displayed in a more clearly visible manner.

In this exemplary embodiment, a comparison command image 381 is displayed in the menu bar 380.

The comparison command image 381 is an image for receiving a command from the user for comparing a file corresponding to the enlarged image 360 with another file different from the aforementioned file.

Alternatively, the comparison command image 381 may be displayed separately from the menu bar 380.

Next, a search screen 350 serving as a screen for receiving a searching process from the user will be described with reference to FIG. 6.

In this exemplary embodiment, when the user performs an operation for selecting the comparison command image 381 shown in FIG. 5B, the search screen 350 shown in FIG. 6 is displayed.

The search screen 350 is displayed on the operation screen 300 where the enlarged image 360 is displayed. With the displaying of the search screen 350, the operation screen 300 changes from the state shown in FIG. 5B to the state shown in FIG. 6.

The search screen 350 (see FIG. 6) according to this exemplary embodiment receives search conditions to be set, such as a filename, a text string within a file, a file type, and a search range.

The search screen 350 is a screen that displays a file or files corresponding to the search conditions. In other words, the search screen 350 is a screen that displays a search result.

The search screen 350 is also a screen that receives an operation performed by the user for specifying a file from the search result.

When a search is to be performed, the user first positions the cursor 200 on the comparison command image 381 in the menu bar 380 (see FIG. 5B) and selects the comparison command image 381. Accordingly, as shown in FIG. 6, the search screen 350 is displayed while the enlarged image 360 is maintained in a displayed state.

An example of the operation for selecting the comparison command image 381 includes a clicking operation performed on the comparison command image 381.

Alternatively, the search screen 350 may be displayed when an operation is performed by the user for executing a search via the search window 330 instead of when the comparison command image 381 is selected.

The search screen 350 has an input field 351 for receiving an input of a text string to be searched for, a setting field 352 for receiving a search range to be set, a specification field 353 for displaying a search result and receiving specification of a file, and a close button 354 for receiving an operation performed by the user for closing the search screen 350. The search based on the text string input to the input field 351 is targeted to a filename or the contents of a file.

In the setting field 352, a select button 352a receives a search range for the text string "Sample.pdf" input to the input field 351 from, for example, "all", "workspace", "tray", and "personal private box" options.

The "all" option refers to a search performed within a search range covering not only on the workspace 400 (i.e., the "workspace A" in FIG. 5B) displayed on the operation screen 300 at that time point but also another workspace 400 that is not displayed.

In other words, the "all" option refers to a search performed within a search range covering all the file storage locations accessible via the terminal apparatus 20.

The "workspace" option refers to a search performed within a search range covering the workspace 400 displayed on the operation screen 300 or a workspace 400 designated in a select field 352b.

The "tray" option refers to a search performed within a search range covering a tray or trays associated with the workspace 400 displayed on the operation screen 300. More specifically, the "tray" option refers to a search performed within a search range covering a tray or trays associated with the workspace 400 displayed on the operation screen 300 and having a tray name or names designated in the select field 352b.

The "personal private box" option refers to a search performed within a search range covering a private box of the user operating the operation screen 300.

The targeted ranges of the "tray" option and the "personal private box" option are smaller than the targeted range of the "workspace" option.

A clear button 352c receives an operation performed by the user for deleting the set search range.

A search button 352d receives an operation performed by the user for executing a search within the set range.

A reduce button 352e receives an operation performed by the user for reducing the display of the setting field 352 or an operation performed by the user for setting the setting field 352 to a non-displayed state.

In the specification field 353, a search result is displayed. In the example in FIG. 6, files having document names "Sample1.pdf", "Sample2.pdf", and "Sample3.pdf" as filenames are displayed as the "files corresponding to the search conditions".

As an alternative to this display example in which the file storage locations are displayed in units of workspaces, as indicated by reference sign 353*b*, the file storage locations may be displayed in units of trays, folders, or private boxes.

Furthermore, in addition to the information about the file type, the filename, and the storage location, the specification field 353 may display information about the updated date and time, the created date and time, the creator, and the file volume.

These pieces of information are displayed together with any one of or a combination of a thumbnail image, a graphic symbol, and text.

Each of checkboxes 353*a* receives an operation performed by the user for selecting a file from the files corresponding to the search conditions.

In this exemplary embodiment, the file selection is performed twice by the user.

In detail, in this exemplary embodiment, as shown in FIG. 4, the user selects the selected icon 310S, whereby first file selection is performed by the user.

Furthermore, in this exemplary embodiment, a file is selected from the file or files corresponding to the search conditions, whereby second file selection is performed by the user. In detail, the user selects any of the checkboxes 353*a* to perform the second file selection.

In the following description, the file to be selected in the first file selection will be referred to as "first file", and the file to be selected in the second file selection will be referred to as "second file".

In this exemplary embodiment, as shown in FIG. 6, the display modes of the multiple checkboxes 353*a* are different from one another. The checkboxes 353*a* are displayed with different colors or different shapes.

An image for receiving an operation for collectively selecting the multiple checkboxes 353*a* may be further displayed.

As an alternative to the example shown in FIG. 6 in which the user performs an operation for selecting any of the checkboxes 353*a* to specify a second file, the process for specifying the second file does not have to involve a specific operation by the user.

The second file is not limited to a file specified by the user from the aforementioned search result. For example, all files corresponding to the aforementioned search result may be specified as second files.

In this exemplary embodiment, file information about a second file that is different from the first file and that is specified as a result of a searching process performed by the user in a state where the enlarged image 360 is displayed on the operation screen 300 is acquired.

As shown in FIG. 6, in this exemplary embodiment, the user performs a search via the search screen 350 in a state where the enlarged image 360 corresponding to the first file is displayed on the operation screen 300, and specifies a second file different from the first file. Accordingly, in this exemplary embodiment, file information about the second file different from the first file is acquired in a state where the enlarged image 360 is displayed on the operation screen 300.

Next, the display position of the search screen 350 will be described.

In the display example in FIG. 6, the search screen 350 is displayed without overlapping the enlarged image 360. Accordingly, the search conditions are set by the user in a state where the user is capable of viewing the enlarged image 360.

The display position of the enlarged image 360 varies between a case where the search screen 350 is displayed and a case where the search screen 350 is not displayed.

In other words, the display position of the enlarged image 360 varies between a case where the aforementioned comparison command image 381 is selected by the user and a case where the aforementioned comparison command image 381 is not selected by the user.

In this exemplary embodiment, if the search screen 350 is not displayed and the enlarged image 360 alone is displayed, the display position of the enlarged image 360 is located around the selected icon 310S such that it is recognizable that the selected icon 310S and the enlarged image 360 are associated with each other, as shown in FIG. 4. In the display example in FIG. 4, the display position of the enlarged image 360 is located around the selected icon 310S and toward the middle of the operation screen 300.

If the search screen 350 is displayed, the display position of the enlarged image 360 is located toward an edge of the operation screen 300, as shown in FIG. 6.

In other words, in a case where the aforementioned comparison command image 381 is selected by the user, the display position of the enlarged image 360 is located toward an edge of the operation screen 300, as shown in FIG. 6.

More specifically, when the comparison command image 381 is selected by the user, the display position of the enlarged image 360 is relocated to ensure the display region of the search screen 350.

In detail, as shown in FIGS. 4 and 6, the display position of the enlarged image 360 is relocated from the middle toward an edge of the operation screen 300 to ensure the display region of the search screen 350.

On the other hand, in a case where the comparison command image 381 is not selected by the user, the display position of the enlarged image 360 is associated with the selected icon 310S. For example, as shown in FIG. 4, the display position of the enlarged image 360 is located around the selected icon 310S and toward the middle of the operation screen 300.

The display position of the enlarged image 360 when the search screen 350 is displayed is not limited to this position. The enlarged image 360 may be displayed around the selected icon 310S and toward the middle of the operation screen 300.

For example, when the search screen 350 is displayed, the enlarged image 360 may be displayed toward the middle of the operation screen 300 instead of the display position of the enlarged image 360 being relocated from the position shown in FIG. 4. In this case, although not shown in the drawings, for example, the search screen 350 is displayed in a margin around the enlarged image 360.

Furthermore, although not shown in the drawings, for example, the search screen 350 may be displayed while overlapping the enlarged image 360. More specifically, the search screen 350 may be displayed at the higher display hierarchy (i.e., toward the user's face) on the operation screen 300 than the icons 310 and the enlarged image 360.

Next, the corresponding image 370 serving as an image corresponding to a second file will be described with reference to FIGS. 7A and 7B. As mentioned above, a second file is a file specified by the user from the search result. The corresponding image 370 corresponding to the second file will be described below.

Figure 7A:
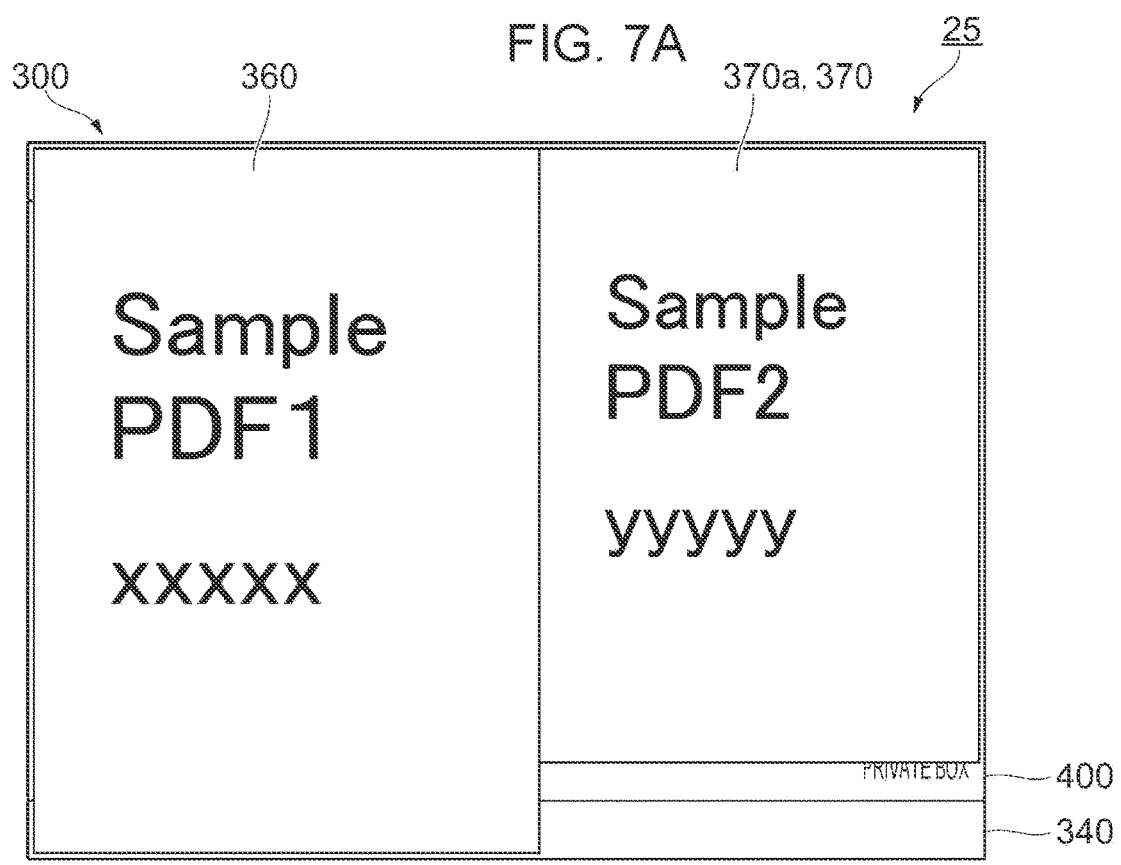
FIGS. 7A and 7B illustrate examples of a corresponding image or images according to this exemplary embodiment, FIG. 7A illustrating a case where a single corresponding image is displayed, FIG. 7B illustrating a case where multiple corresponding images are displayed next to each other.
Figure 7B:
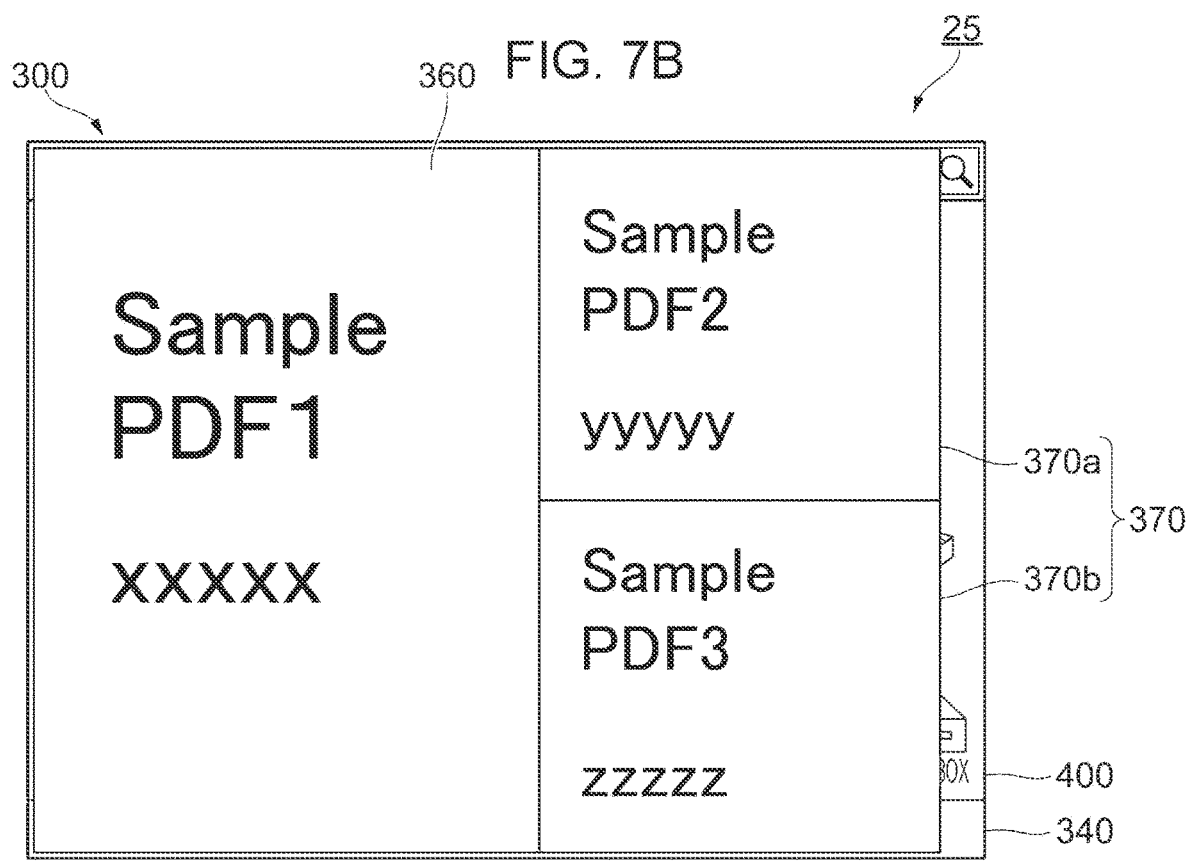

FIGS. 7A and 7B illustrate examples of the corresponding image or images 370 according to this exemplary embodiment. Specifically, FIG. 7A illustrates a case where a single corresponding image 370 is displayed, and FIG. 7B illustrates a case where multiple corresponding images 370 are displayed next to each other. In FIGS. 7A and 7B, the cursor 200 is not shown.

In the display example in FIG. 7A, the enlarged image 360 and the corresponding image 370 (370a) are displayed on the operation screen 300 of the display 25.

In this display example, the enlarged image 360 and the corresponding image 370 are displayed on the operation screen 300 without overlapping each other.

In this exemplary embodiment, the corresponding image 370 is displayed without activation of a new program.

As described above, in this exemplary embodiment, the user specifies a second file from the search result. The corresponding image 370 corresponds to this second file specified by the user. In other words, the corresponding image 370 is an image corresponding to the second file specified by the user and to be compared with a file corresponding to the enlarged image 360.

The user may desire to compare files with each other. In this case, as mentioned above, file selection is performed twice by the user. In this exemplary embodiment, the enlarged image 360 and the corresponding image 370 are displayed as a result of the two file selection processes.

The corresponding image 370 is an image corresponding to the second file specified as a result of the second file selection process performed by the user in a state where the enlarged image 360 is displayed.

In this exemplary embodiment, the corresponding image 370 and the enlarged image 360 are displayed on the operation screen 300 in a state where the two images have a predetermined positional relationship with each other.

An example of the "predetermined positional relationship" includes a positional relationship in which the corresponding image 370 and the enlarged image 360 are displayed without overlapping each other.

Another example of the "predetermined positional relationship" includes a positional relationship in which the corresponding image 370 and the enlarged image 360 are displayed without overlapping each other and in which the corresponding image 370 is displayed around the enlarged image 360.

In this exemplary embodiment, as described above, the user specifies a second file on the search screen 350 (see FIG. 6). Then, in this exemplary embodiment, when the user closes the search screen 350, the corresponding image 370 corresponding to this second file specified by the user is displayed.

When the corresponding image 370 corresponding to the second file is to be displayed, the display mode of the checkbox 353a (see FIG. 6) having received the operation for specifying this second file may be reflected on the corresponding image 370.

For example, the corresponding image 370 may be displayed while being surrounded by a line having the same color as the color of the corresponding checkbox 353a.

More specifically, in this exemplary embodiment, the checkboxes 353a are given different colors, as shown on the search screen 350 in FIG. 6.

When the corresponding image 370 corresponding to the second file specified in accordance with the selection of any of the checkboxes 353a is to be displayed, for example, the outer edge of the corresponding image 370 may be given the color given to the selected checkbox 353a.

The corresponding image 370 (see FIG. 7A) has a display size larger than that of each icon 310 displayed on the operation screen 300 (see FIG. 4). More specifically, the display size of the corresponding image 370 is larger than that of the selected icon 310S (see FIG. 4) serving as a display source of the enlarged image 360.

If there is an icon 310 corresponding to the corresponding image 370, the display size of the corresponding image 370 is larger than the display size of this corresponding icon 310.

Although an icon 310 corresponding to the corresponding image 370 (see FIG. 7A) is not displayed in the display example in FIG. 4, for example, it is also assumable that this icon 310 corresponding to the corresponding image 370 exists on a workspace 400 different from the "workspace A" shown in FIG. 4. In this case, in this exemplary embodiment, the display size of the corresponding image 370 may be larger than the display size of this corresponding icon 310.

When the corresponding image 370 (see FIG. 7A) is to be displayed, the corresponding image 370 and the enlarged image 360 may have at least the same length in the vertical direction or the same width in the horizontal direction.

The display position of the enlarged image 360 varies between a case where the corresponding image 370 is displayed and a case where the corresponding image 370 is not displayed.

In other words, the display position of the enlarged image 360 varies between a case where the aforementioned second file is specified by the user and a case where the aforementioned second file is not specified by the user.

In this exemplary embodiment, if the corresponding image 370 is not displayed and the enlarged image 360 alone is displayed, the display position of the enlarged image 360 is located around the selected icon 310S such that it is recognizable that the enlarged image 360 is associated with the selected icon 310S, as shown in FIG. 4. In the display example in FIG. 4, the display position of the enlarged image 360 is located around the selected icon 310S and toward the middle of the operation screen 300.

If the corresponding image 370 is displayed, the display position of the enlarged image 360 is located toward an edge of the operation screen 300, as shown in FIG. 7A.

In a case where file information about the aforementioned second file specified by the user is acquired and the corresponding image 370 is to be displayed, the display position of the enlarged image 360 is located toward an edge of the operation screen 300, as shown in FIG. 7A.

More specifically, when the file information about the aforementioned second file specified by the user is acquired and the corresponding image 370 is to be displayed, the display position of the enlarged image 360 is relocated to ensure the display region of the corresponding image 370.

In detail, as shown in FIGS. 4 and 7A, the display position of the enlarged image 360 is relocated from the middle toward an edge of the operation screen 300 to ensure the display region of the corresponding image 370.

In this exemplary embodiment, there may be a case where corresponding images 370 respectively corresponding to multiple second files are displayed in a state where the enlarged image 360 is displayed. In this case, for example, the multiple corresponding images 370 are all displayed, as in FIG. 7B showing the corresponding images 370 (370a and 370b).

This example corresponds to a case where two second files are specified by the user from the search result. In this case, two corresponding images 370 are entirely displayed, as shown in the display example in FIG. 7B.

Alternatively, one or some of the multiple corresponding images 370 may be displayed.

The expression "one or some of the corresponding images 370" refers to, for example, a corresponding image or images 370 the number of which is smaller than or equal to a predetermined threshold value.

For example, in a case where the predetermined value is set to 2, if the number of corresponding images 370 exceeds 2, the expression "one or some of the corresponding images 370" refers to two corresponding images 370.

If one or some of the corresponding images 370 are to be displayed in this manner without displaying all of the corresponding images 370, for example, the display may be switched in accordance with a user command such that one or some of the corresponding images 370 to be displayed may be switched.

In the display example in FIG. 7B, the display size of each of the corresponding images 370a and 370b is smaller than that of the corresponding image 370a shown in FIG. 7A.

However, if there is enough display region on the operation screen 300, the corresponding images 370a and 370b may be displayed in FIG. 7B with the same display size as the corresponding image 370a shown in FIG. 7A.

Furthermore, the display positions of the multiple corresponding images 370 are not limited to the positions located next to each other in the vertical direction, and may be located side-by-side in the horizontal direction.

Next, a menu image serving as an image for receiving an operation performed by the user on the enlarged image 360 or the corresponding image 370 will be described with reference to FIGS. 8A and 8B. In this example, a menu bar 380 is displayed as the menu image.

Figure 8A:
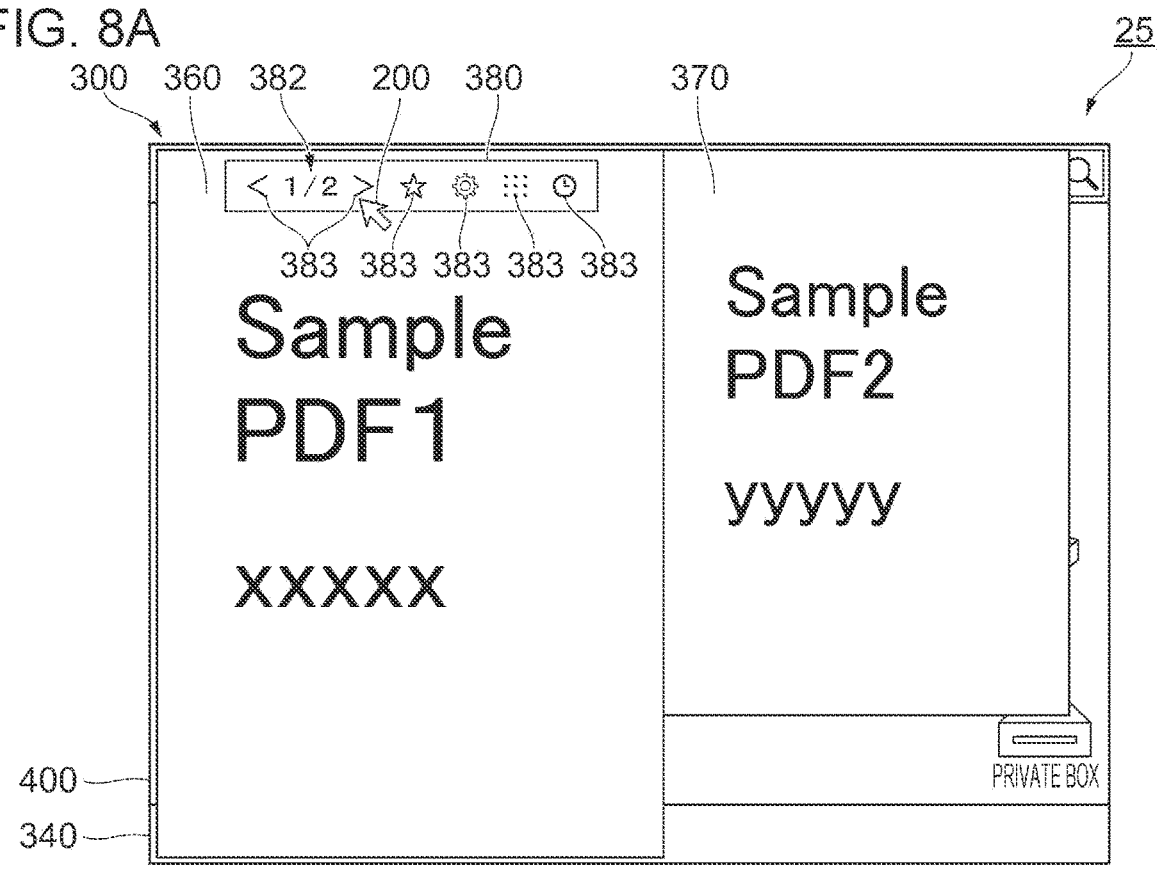
FIGS. 8A and 8B illustrate a display example of the menu bar according to this exemplary embodiment, FIG. 8A illustrating a case where an enlarged image is designated, FIG. 8B illustrating a case where the corresponding image is designated.
Figure 8B:
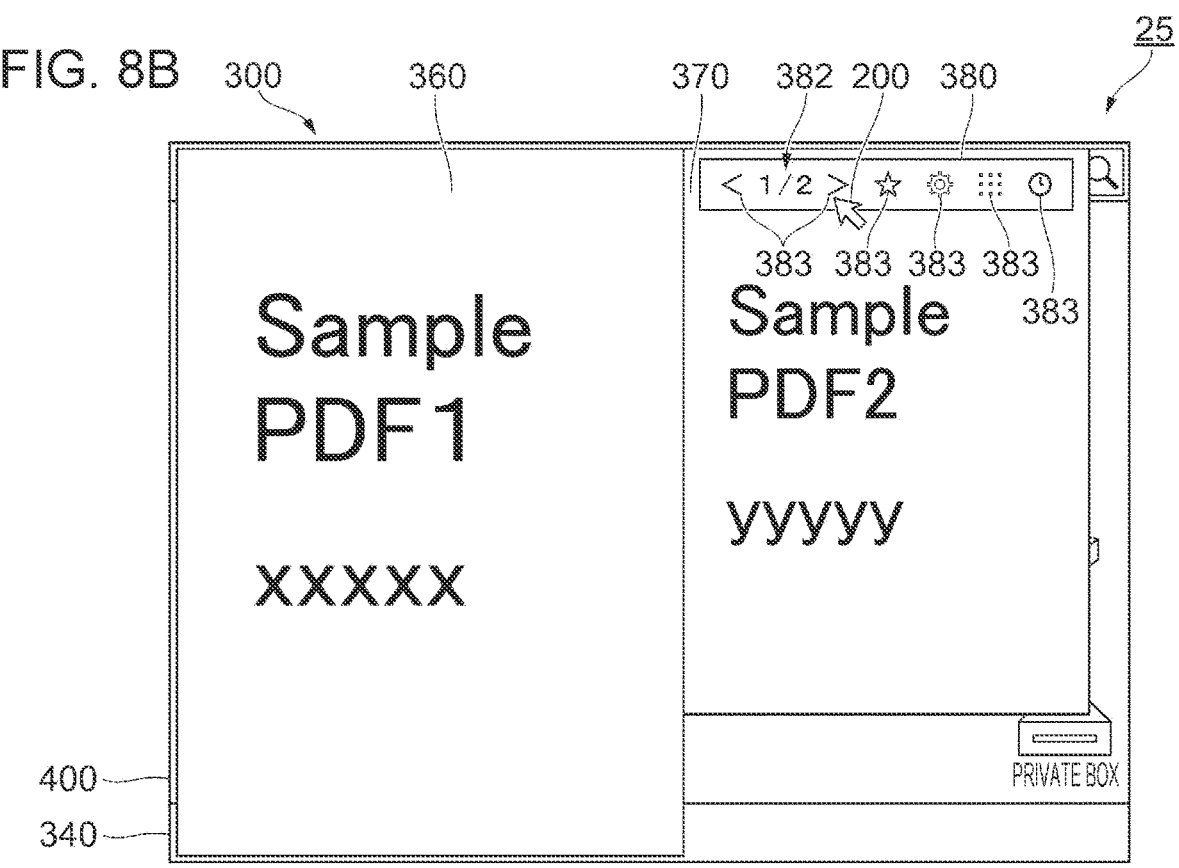

FIGS. 8A and 8B illustrate a display example of the menu bar 380 according to this exemplary embodiment. Specifically, FIG. 8A illustrates a case where the enlarged image 360 is designated, and FIG. 8B illustrates a case where the corresponding image 370 is designated.

In this exemplary embodiment, as described above, when the search screen 350 is closed after a second file is specified by the user, the enlarged image 360 and the corresponding image 370 are displayed on the operation screen 300.

The menu bar 380 according to this exemplary embodiment is displayed in association with the enlarged image 360 or the corresponding image 370 designated by the user.

In this exemplary embodiment, when the cursor 200 is positioned on the enlarged image 360, the menu bar 380 is displayed on the enlarged image 360, as shown in FIG. 8A. In other words, when the enlarged image 360 is designated by the user, the menu bar 380 is displayed on the enlarged image 360.

In the display example in FIG. 8A, the cursor 200 is positioned on the menu bar 380 on the enlarged image 360. If any of the button images 383 is operated in a state where the menu bar 380 is displayed on the enlarged image 360, a process corresponding to this button image 383 is executed, and this process is reflected on the enlarged image 360 on which the menu bar 380 is displayed.

The button images 383 in the menu bar 380 shown in FIG. 8A may be identical to the button images 383 shown in FIG. 5A.

Although the comparison command image 381 is not displayed in the display example in FIG. 8A, the comparison command image 381 may be displayed, as shown in FIG. 5A.

In the display example in FIG. 8B, the corresponding image 370 is designated by the user. Furthermore, in the display example in FIG. 8B, the cursor 200 is positioned on the menu bar 380 on the corresponding image 370.

In this exemplary embodiment, when the cursor 200 is positioned on the corresponding image 370, the menu bar 380 is displayed on this corresponding image 370 on which the cursor 200 is positioned.

When any of the button images 383 is operated in the state where the menu bar 380 is displayed on the corresponding image 370, a process corresponding to this button image 383 is executed, and this process is reflected on the corresponding image 370 on which the menu bar 380 is displayed.

The above description relates to a case where the enlarged image 360 or the corresponding image 370 designated by the user is displayed in association with the menu bar 380.

Alternatively, a common menu bar (not shown) shared between the two images, namely, the enlarged image 360 and the corresponding image 370, may be displayed.

When any of menu-related button images is operated on this common menu bar, a process corresponding to this button image is executed. In this case, this process is reflected on both the enlarged image 360 and the corresponding image 370. Alternatively, the user may be inquired about whether or not the process is to be reflected on both the enlarged image 360 and the corresponding image 370.

As an alternative to the above-described example where the corresponding image 370 is to be displayed when a command for closing the search screen 350 is given by the user, the corresponding image 370 may be displayed when a specific operation different from the command for closing the search screen 350 is performed by the user.

For example, an image that receives a command for displaying the corresponding image 370 from the user may be displayed, and the corresponding image 370 may be displayed when the user selects this image.

Figure 9A:
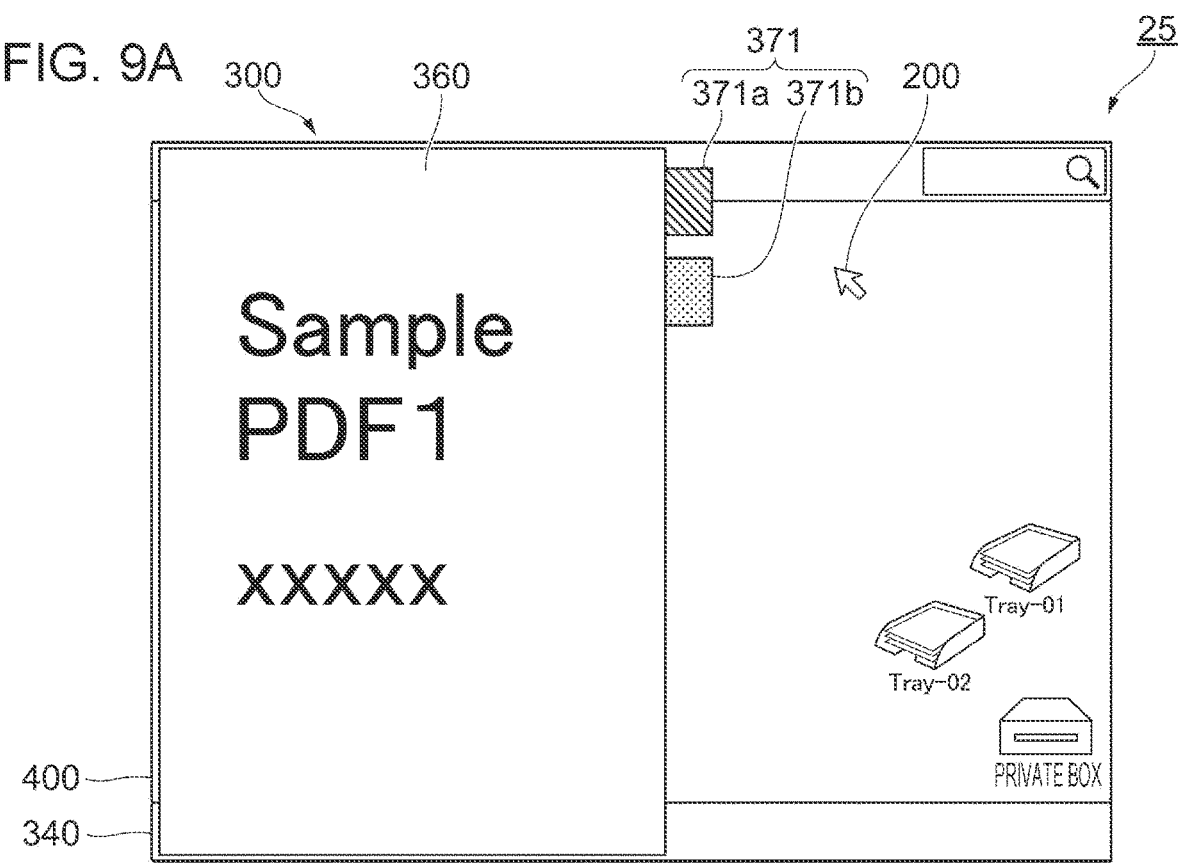
FIGS. 9A and 9B illustrate an example of each correspondence command image that receives a command for displaying the corresponding image from the user, FIG. 9A illustrating a case where a correspondence command image is not selected by the user, FIG. 9B illustrating a case where a correspondence command image is selected by the user.
Figure 9B:
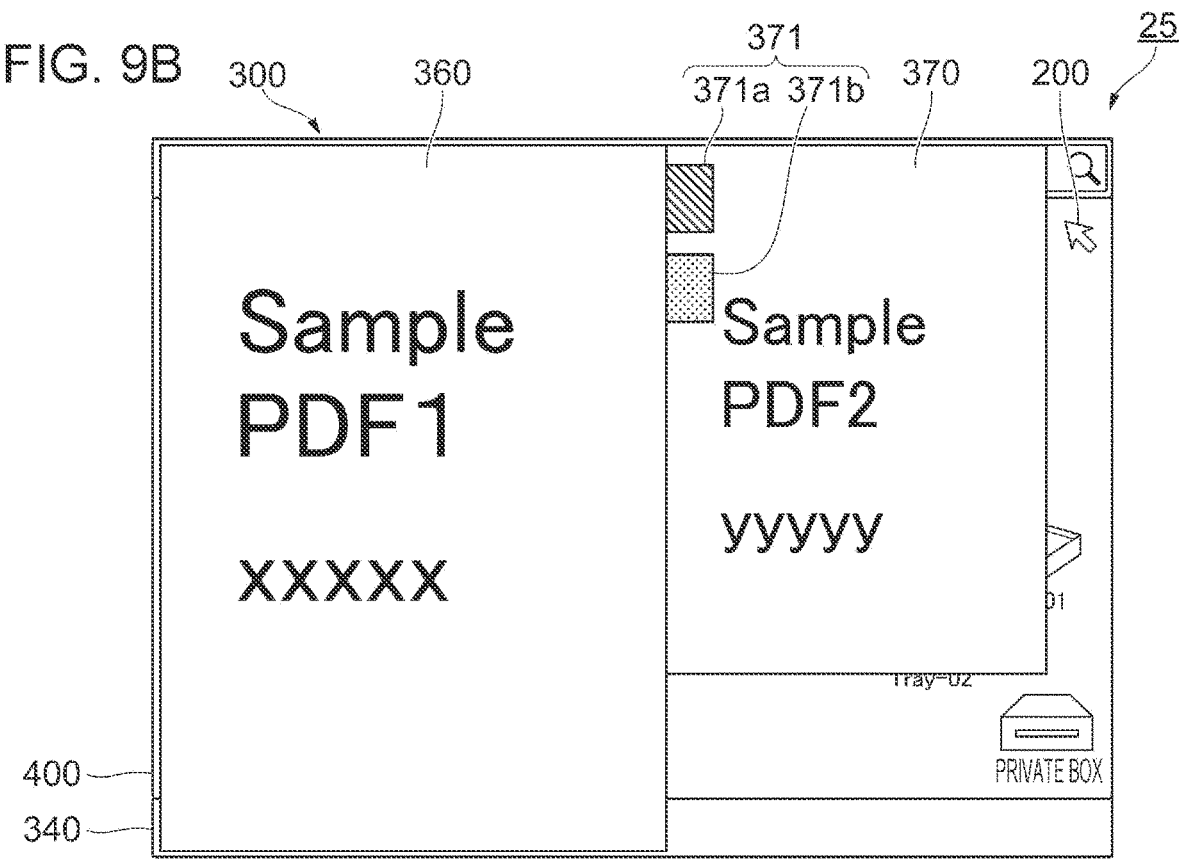

FIGS. 9A and 9B illustrate an example of correspondence command images 371 for receiving a command for displaying corresponding images 370 from the user. Specifically, FIG. 9A illustrates a case where a correspondence command image 371a is not selected by the user, and FIG. 9B illustrates a case where the correspondence command image 371a is selected by the user.

In the display example in FIG. 9A, the enlarged image 360 and correspondence command images 371a and 371b for receiving a command for displaying the corresponding images 370 are displayed on the operation screen 300 of the display 25. The correspondence command images 371a and 371b will be referred to as the correspondence command images 371 if they are not to be differentiated from each other.

In the display example in FIG. 9A, file information about each second file specified in accordance with a searching process performed by the user is associated with the first file.

More specifically, in the display example in FIG. 9A, second files are specified by the user, and the correspondence command images 371 are displayed with respect to the first file indicated by the enlarged image 360. With each of these correspondence command images 371, file information serving as information about each second file is associated with the enlarged image 360.

In the display example in FIG. 9A, the enlarged image 360 is displayed toward an edge of the operation screen 300. In detail, in the display example in FIG. 9A, the enlarged image 360 is displayed toward the left side of the operation screen 300.

Alternatively, the enlarged image 360 may be displayed toward the middle of the operation screen 300. If the user has performed an operation for selecting one of the correspondence command images 371, the enlarged image 360 may be moved such that the display position of the enlarged image 360 is relocated from the middle toward an edge of the operation screen 300.

In this exemplary embodiment, the correspondence command images 371 are displayed in association with the enlarged image 360. Each correspondence command image 371 indicates that the aforementioned file information serving as information about the corresponding second file specified by the user has been acquired.

Moreover, each correspondence command image 371 corresponds to the file information serving as information about the second file specified by the user. Each of the correspondence command images 371 (371*a* and 371*b*) corresponds to each piece of file information.

The display mode of each correspondence command image 371 is based on the display mode of each checkbox 353*a* (see FIG. 6) that receives a file specifying operation performed by the user. In detail, in this exemplary embodiment, the color and the shape of each checkbox 353*a* is reflected on each correspondence command image 371.

In this exemplary embodiment, for example, when the user performs a clicking operation of one of the correspondence command images 371 in the state shown in FIG. 9A, the corresponding image 370 is displayed, as shown in FIG. 9B.

In the display example in FIG. 9B, the correspondence command image 371*a*, shown in FIG. 9A, corresponding to a first one of the second files is selected by the user, and the corresponding image 370 corresponding to this correspondence command image 371*a* is displayed.

In the display example in FIG. 9B, the correspondence command images 371 are maintained in a displayed state even after the corresponding image 370 is displayed. More specifically, the display positions of the correspondence command images 371 are maintained even after the corresponding image 370 is displayed, and the correspondence command images 371 are displayed in association with the enlarged image 360.

Furthermore, even after the corresponding image 370 is displayed, the correspondence command image 371*a* that has received the command for displaying this corresponding image 370 from the user is maintained in a displayed state.

Alternatively, when the corresponding image 370 corresponding to the correspondence command image 371*a* is displayed, the correspondence command image 371*a* selected by the user may be set to a non-displayed state.

In this case, an area of the corresponding image 370 (see FIG. 9B) located behind the correspondence command image 371*a* is displayed, thereby improving the visibility of the corresponding image 370 for the user.

Likewise, when the correspondence command image 371*b*, shown in FIG. 9A, corresponding to a second one of the second files is selected by the user and the corresponding image 370 corresponding to this correspondence command image 371*b* is displayed, the correspondence command images 371 are maintained in a displayed state.

Furthermore, when the corresponding image 370 corresponding to the correspondence command image 371*b* is displayed, the correspondence command image 371*b* that has received the command for displaying this corresponding image 370 from the user is similarly maintained in a displayed state.

Alternatively, as mentioned above, when the corresponding image 370 corresponding to the correspondence command image 371*b* is displayed, the correspondence command image 371*b* selected by the user may be similarly set to a non-displayed state.

In this exemplary embodiment, when the correspondence command image 371*b* is selected by the user in the state shown in FIG. 9B, the display of the corresponding image 370 is switched such that the corresponding image 370 corresponding to the correspondence command image 371*b* is displayed.

This switching of the display of the corresponding image 370 is performed while the enlarged image 360 is maintained in a displayed state.

Furthermore, in this exemplary embodiment, when the correspondence command image 371*b* is selected by the user while the correspondence command image 371*a* is in a non-displayed state, the previously non-displayed correspondence command image 371*a* is displayed again.

In this exemplary embodiment, as mentioned above, a process for setting the selected correspondence command image 371 to a non-displayed state may be performed, and the correspondence command image 371*a* may be in a non-displayed state when the correspondence command image 371*b* is selected by the user. In this case, when the correspondence command image 371*b* is selected by the user, the previously non-displayed correspondence command image 371*a* may be displayed again in this exemplary embodiment.

More specifically, when the correspondence command image 371*b* is selected by the user while the correspondence command image 371*a* is in a non-displayed state, the previously non-displayed correspondence command image 371*a* may be displayed again in association with the enlarged image 360.

Alternatively, when the correspondence command image 371*b* is selected, the corresponding image 370 corresponding to the correspondence command image 371*b* may be additionally displayed instead of switching the display of the corresponding image 370.

In this case, for example, as shown in FIG. 7B, multiple corresponding images 370 are displayed.

Although the above description relates to an example where the enlarged image 360 is maintained in a displayed state without switching the display of the enlarged image 360, the example is not limited to this.

For example, although not shown in the drawings, if the user specifies multiple second files and acquires multiple pieces of file information and if a predetermined condition is satisfied, the enlarged image 360 may be set to a non-displayed state, and multiple corresponding images 370 may be displayed.

An example of the "predetermined condition" includes a case where the user gives a command for setting the enlarged image 360 to a non-displayed state. Another example of the "predetermined condition" includes a case where the display command given by the user is targeted to a large number of corresponding images 370 and this number exceeds a predetermined threshold value.

A yet another example of the "predetermined condition" includes a case where one of the correspondence command images 371 is selected by the user.

In detail, for example, in FIG. 9B, in a case where the correspondence command image 371*b* is selected by the user, the enlarged image 360 is set to a non-displayed state, and the corresponding image 370 corresponding to the correspondence command image 371*b* is displayed.

Alternatively, for example, if the user gives a command for setting the enlarged image 360 to a non-displayed state, the corresponding image 370 may be set to a non-displayed state. In other words, if an operation performed by the user for setting the enlarged image 360 to a non-displayed state is received, the enlarged image 360 and the corresponding image 370 may be set to a non-displayed state.

The corresponding image 370 is an image corresponding to a second file specified by the user and to be compared with a file corresponding to the enlarged image 360. If the enlarged image 360 is not to be displayed, the corresponding image 370 is basically not to be displayed.

If the enlarged image 360 and the corresponding image 370 are to be set to a non-displayed state when an operation performed by the user for setting the enlarged image 360 to a non-displayed state is received, the user does not have to perform an operation for setting the corresponding image 370 to a non-displayed state, thereby simplifying the user's operation.

An example of this "operation for setting the enlarged image 360 to a non-displayed state" includes an operation performed by the user for selecting a non-display button image (not shown) displayed on the enlarged image 360.

Another example of the "operation for setting the enlarged image 360 to a non-displayed state" includes an operation performed by the user for selecting a region different from the region where the enlarged image 360 and the corresponding image 370 are displayed. More specifically, this example includes an operation involving using a mouse device to click on a region different from the region where the enlarged image 360 and the corresponding image 370 are displayed.

In detail, for example, as shown in FIG. 9B, when the user performs a clicking operation by using a mouse device in a state where the cursor 200 is positioned outside the display region of the enlarged image 360 and the corresponding image 370, the enlarged image 360 and the corresponding image 370 are set to a non-displayed state.

As an alternative to the above description where one set of correspondence command images 371 are displayed, multiple sets of correspondence command images 371 having the same combination of correspondence command images 371 may be displayed.

A process to be executed when multiple sets of correspondence command images 371 are displayed will now be described with reference to FIGS. 10A and 10B.

FIGS. 10A and 10B illustrate another example of the correspondence command images 371. Specifically, FIG. 10A illustrates a case where the user has not selected any of the correspondence command images 371, and FIG. 10B illustrates a case where the user has selected the correspondence command image 371a included in a first set of images 371X.

In the example shown in FIG. 10A, multiple sets of correspondence command images 371 are displayed.

In the example shown in FIG. 10A, a first set of correspondence command images 371 (referred to as "first set of images 371X" hereinafter) are displayed to the left of the enlarged image 360. Moreover, a second set of correspondence command images 371 (referred to as "second set of images 371Y" hereinafter) are displayed to the right of the enlarged image 360.

In this exemplary embodiment, for example, when the user performs a clicking operation on one of the correspondence command images 371 in the state shown in FIG. 10A, the corresponding image 370 is displayed, as shown in FIG. 10B.

In detail, in this exemplary embodiment, when the user selects one of the correspondence command images 371 included in the first set of images 371X, the corresponding image 370 corresponding to this correspondence command image 371 is displayed to the left of the enlarged image 360, as shown in FIG. 10B.

More specifically, when the user selects one of the correspondence command images 371 included in the first set of images 371X, the display position of the enlarged image 360 is relocated from the left side to the right side of the operation screen 300, and the corresponding image 370 is displayed to the left of the enlarged image 360.

More specifically, in the display example in FIG. 10B, the correspondence command image 371a included in the first set of images 371X is selected by the user, and the corresponding image 370 corresponding to the correspondence command image 371a is displayed to the left of the enlarged image 360.

Furthermore, although not shown in the drawings, when the correspondence command image 371b included in the first set of images 371X is selected by the user, the corresponding image 370 corresponding to the correspondence command image 371b is displayed to the left of the enlarged image 360.

Similar to the above, when the correspondence command image 371a or the correspondence command image 371b included in the first set of images 371X is selected by the user, the selected correspondence command image 371a or correspondence command image 371b may be set to a non-displayed state.

Although not shown in the drawings, when the correspondence command image 371a or the correspondence command image 371b included in the second set of images 371Y (see FIG. 10A) is selected by the user, the corresponding image 370 corresponding to the selected correspondence command image 371a or correspondence command image 371b is displayed to the right of the enlarged image 360.

Similar to the above, when the correspondence command image 371a or the correspondence command image 371b included in the second set of images 371Y is selected by the user, the selected correspondence command image 371a or correspondence command image 371b may be set to a non-displayed state.

In this exemplary embodiment, the positional relationship between the enlarged image 360 and the corresponding image 370 is set in accordance with the display position of the correspondence command image 371 selected by the user. Accordingly, a transition to the display mode desired by the user may be performed more quickly.

In a case where the corresponding image 370 is to be displayed at a location according to the display position of the correspondence command image 371 selected by the user, the user does not have to perform an operation for changing the display position of the displayed corresponding image 370, thereby achieving a simplified operation.

More specifically, in this exemplary embodiment, when the user desires that the corresponding image 370 be displayed to the right of the enlarged image 360, the user may simply select an image from the second set of images 371Y. If the user desires that the corresponding image 370 be displayed to the left of the enlarged image 360, the user may simply select an image from the first set of images 371X. In this case, the user does not have to perform an operation for changing the display position of the displayed corresponding image 370, thereby achieving a simplified operation.

Although each correspondence command image 371 is displayed at its original position even when the corresponding image 370 is displayed in the above-described example, the display mode of the correspondence command image 371 is not limited to this.

For example, the correspondence command image 371 selected by the user may be displayed in association with the corresponding image 370.

A process to be executed when the correspondence command image 371 is displayed in association with the corresponding image 370 will now be described with reference to FIGS. 11A and 11B.

Figure 11A:
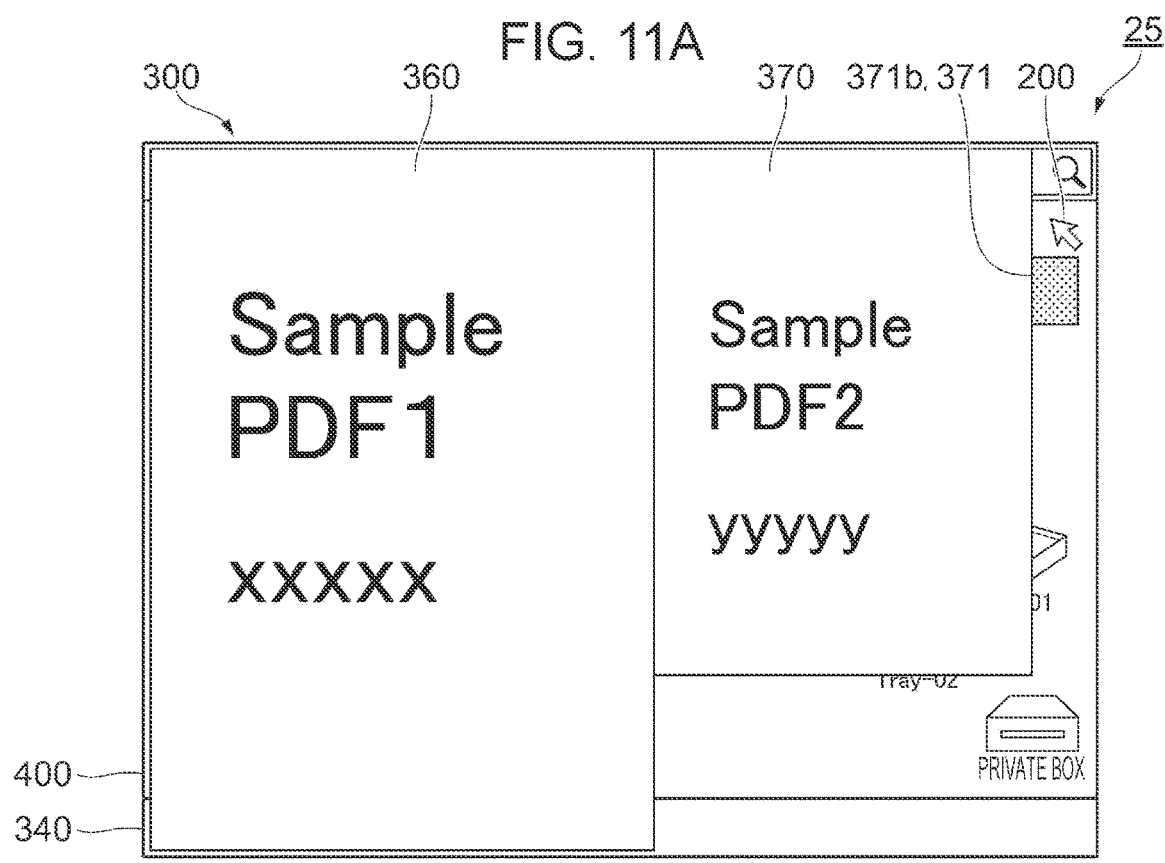
FIGS. 11A and 11B illustrate other examples of the correspondence command images, FIG. 11A illustrating a state where one set of correspondence command images is displayed, FIG. 11B illustrating a state where multiple sets of correspondence command images are displayed.
Figure 11B:
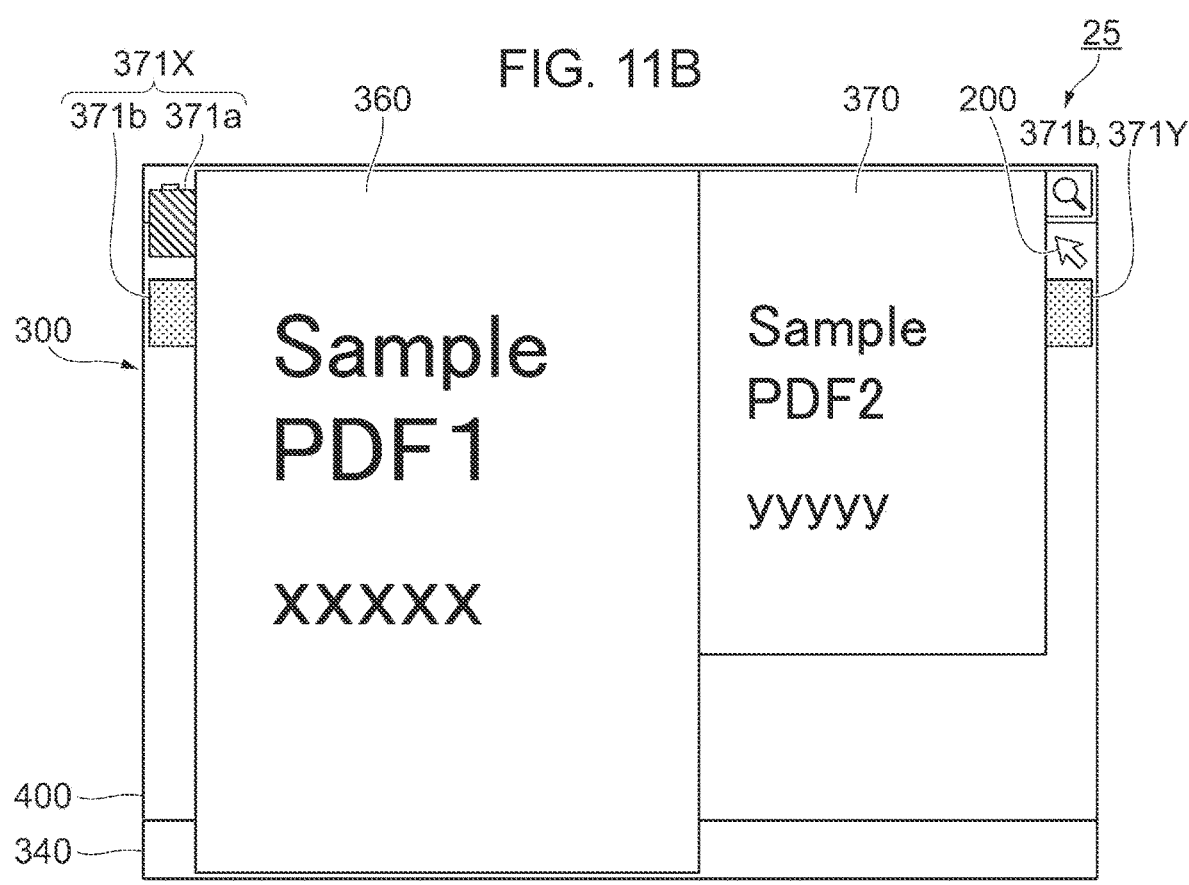

FIGS. 11A and 11B illustrate other display examples of the correspondence command images 371. Specifically, FIG. 11A illustrates a state where one set of correspondence command images 371 are displayed, and FIG. 11B illustrates a state where multiple sets of correspondence command images 371 are displayed.

In this process example, for example, when the user performs a clicking operation on one of the correspondence command images 371 in the state shown in FIG. 9A, the corresponding image 370 and the correspondence command image 371 are displayed, as shown in FIG. 11A.

In the example shown in FIG. 11A, the display position of the correspondence command image 371 changes. In this display example, when the correspondence command image 371a included in the correspondence command images 371 is selected in the state shown in FIG. 9A, the correspondence command image 371 is displayed in association with the corresponding image 370, as shown in FIG. 11A.

Furthermore, in the display example in FIG. 11A, the correspondence command image 371a selected by the user is in a non-displayed state. The correspondence command image 371b is maintained in a displayed state.

In the display example shown in FIG. 11A, the correspondence command image 371 is displayed without overlapping the corresponding image 370. Accordingly, a situation where the corresponding image 370 is partially located behind the correspondence command image 371 is avoided, thereby improving the visibility of the corresponding image 370 for the user.

In contrast to the display example in FIG. 9B in which the corresponding image 370 is partially located behind the correspondence command image 371, a situation where the corresponding image 370 is located behind the correspondence command image 371 is avoided in the display example in FIG. 11A, thereby improving the visibility of the corresponding image 370 for the user.

Similar to the above, although not shown in the drawings, when the user selects the correspondence command image 371b (see FIG. 11A), the corresponding image 370 corresponding to the correspondence command image 371b is displayed. When the corresponding image 370 corresponding to the correspondence command image 371b is displayed, the correspondence command image 371b may be set to a non-displayed state.

Furthermore, in this process example, when the correspondence command image 371b (see FIG. 11A) is selected by the user, the previously non-displayed correspondence command image 371a is displayed. More specifically, when the correspondence command image 371b is selected, the correspondence command image 371a is displayed in association with the enlarged image 360.

Next, the display example of the multiple sets of correspondence command images 371 in a state where the corresponding image 370 is displayed will be described with reference to FIG. 11B.

In the example shown in FIG. 11B, the corresponding image 370, the first set of images 371X, and the second set of images 371Y are displayed.

Similar to the above, the display position of the corresponding image 370 is set in accordance with the display position of the correspondence command image 371 selected by the user.

Similar to the above, each correspondence command image 371 may be set to a non-displayed state when selected by the user.

The display example in FIG. 11B corresponds to a case where the correspondence command image 371a included in the second set of images 371Y is selected by the user in the state shown in FIG. 10A.

In the display example in FIG. 11B, the corresponding image 370 corresponding to the correspondence command image 371a is displayed to the right of the enlarged image 360. The second set of images 371Y selected by the user are displayed in association with the corresponding image 370.

On the other hand, the display positions of the first set of images 371X not selected by the user are located at their original positions, and the first set of images 371X are displayed in association with the enlarged image 360.

Furthermore, in the display example in FIG. 11B, the correspondence command image 371a included in the second set of images 371Y and selected by the user is in a non-displayed state. The correspondence command image 371b included in the second set of images 371Y is maintained in a displayed state.

In contrast to the display example in FIG. 10B in which the corresponding image 370 is partially located behind the correspondence command images 371, a situation where the corresponding image 370 is located behind the correspondence command images 371 is avoided in the display example in FIG. 11B, thereby improving the visibility of the corresponding image 370 for the user.

Similar to the above, although not shown in the drawings, in this process example, when the user selects the correspondence command image 371b included in the second set of images 371Y (see FIG. 11B), the corresponding image 370 corresponding to the correspondence command image 371b is displayed to the right of the enlarged image 360.

Furthermore, similar to the above, although not shown in the drawings, when the user selects the correspondence command image 371a or the correspondence command image 371b included in the first set of images 371X, the corresponding image 370 corresponding to the selected correspondence command image 371a or correspondence command image 371b is displayed.

More specifically, the corresponding image 370 corresponding to the selected correspondence command image 371a or correspondence command image 371b is displayed to the left of the enlarged image 360.

Furthermore, for example, if the user gives a command for not displaying the enlarged image 360, the enlarged image 360 may be set to a non-displayed state, and the storage location of the second file corresponding to the corresponding image 370 may be displayed.

In other words, if the user gives a command for not displaying the enlarged image 360, the enlarged image 360 may be set to a non-displayed state, and information indicating the storage destination of the second file specified in accordance with the searching process performed by the user may be displayed.

FIGS. 12A and 12B illustrate display examples of the information indicating the second-file storage destination.

The operation screen 300 illustrated in the display example in FIG. 12A corresponds to a case where the user gives a command for not displaying the enlarged image 360 when the operation screen 300 shown in FIG. 11A is displayed.

In this exemplary embodiment, as mentioned above, the enlarged image 360 is settable to a non-displayed state. As shown in FIG. 12A, the enlarged image 360 is set to a non-displayed state in response to a user command.

In the display example in FIG. 12A, the information indicating the second-file storage destination is displayed at the previously-displayed location of the enlarged image 360. The information indicating the second-file storage destination is displayed within a presentation screen 390.

The presentation screen 390 displays a result of a search performed on the search screen 350 (see FIG. 6).

The search result shown in FIG. 12A includes a filename of each second file and information indicating the storage destination of the second file. With the information indicating the storage destination being displayed, the user may ascertain at which storage destination the file specified by the user is stored during the search.

In addition to or in place of the filename and the information about the storage location serving as a storage destination, the presentation screen 390 may display information about, for example, the file type, the updated date and time, the created date and time, the creator, and the file volume. These pieces of information are displayed together with any one of or a combination of a thumbnail image, a graphic symbol, and text.

The display mode of the presentation screen 390 is based on the display mode of each checkbox 353a (see FIG. 6) that receives a file specifying operation performed by the user. In detail, in this exemplary embodiment, the color or shape of each checkbox 353a is reflected on the information about the corresponding file presented on the presentation screen 390.

In the display example in FIG. 12A, the presentation screen 390 is associated with the corresponding image 370. Furthermore, in the display example in FIG. 12A, the presentation screen 390 is displayed without overlapping the corresponding image 370.

Alternatively, the presentation screen 390 may be displayed while overlapping the corresponding image 370. Furthermore, for example, the presentation screen 390 may be displayed at the higher display hierarchy (i.e., toward the user's face) on the operation screen 300 than the icons 310 and the corresponding image 370.

In the display example in FIG. 12A, the presentation screen 390 is displayed in a state where a single corresponding image 370 is displayed on the operation screen 300. Alternatively, although not shown in the drawings, the presentation screen 390 may be displayed in a state where two or more corresponding images 370 are displayed on the operation screen 300.

The presentation screen 390 in the example shown in FIG. 12A is displayed in a case where the user gives a command for not displaying the enlarged image 360 when the operation screen 300 shown in FIG. 11A is being displayed. This presentation screen 390 may be displayed on the operation screen 300 in a case where the user gives a command for not displaying the enlarged image 360 when the operation screen 300 shown in FIGS. 7 to 10 and FIG. 11B is being displayed.

The example in FIG. 12A corresponds to a case where the presentation screen 390 is displayed when the enlarged image 360 is set to a non-displayed state.

Alternatively, although not shown in the drawings, the presentation screen 390 may be displayed while the enlarged image 360 is in a displayed state.

When the second-file storage destination is to be presented to the user, the storage destination may be presented by switching the workspace 400 displayed on the operation screen 300 to a workspace 400 where the icon 310 corresponding to the second file is located.

The display example in FIG. 12B shows the operation screen 300 after the workspace 400, shown in FIG. 11A, previously displaying the enlarged image 360 has been switched from the "workspace A" to a "workspace B" serving as a second-file storage destination.

In this case, the user refers to a location indicated by reference sign 301 in FIG. 12B to ascertain that the storage destination of the second file corresponding to the corresponding image 370 is the "workspace B".

In FIG. 12B, the corresponding image 370 is displayed in association with the document icon 310a corresponding to the second file.

In this case, the user ascertains that the icon 310 corresponding to the second file displayed as the corresponding image 370 is the document icon 310a corresponding to a file having a filename "Sample2".

This corresponding image 370 may have a display size larger than the size (see FIG. 11A) of the corresponding image 370 when displayed together with the enlarged image 360.

Next, a process to be executed when the corresponding image 370 in a displayed state is to be set to a non-displayed state will be described with reference to FIGS. 13A and 13B. The following description relates to a case where the corresponding image 370 in a displayed state is set to a non-displayed state by using the cursor 200.

Figure 13A:
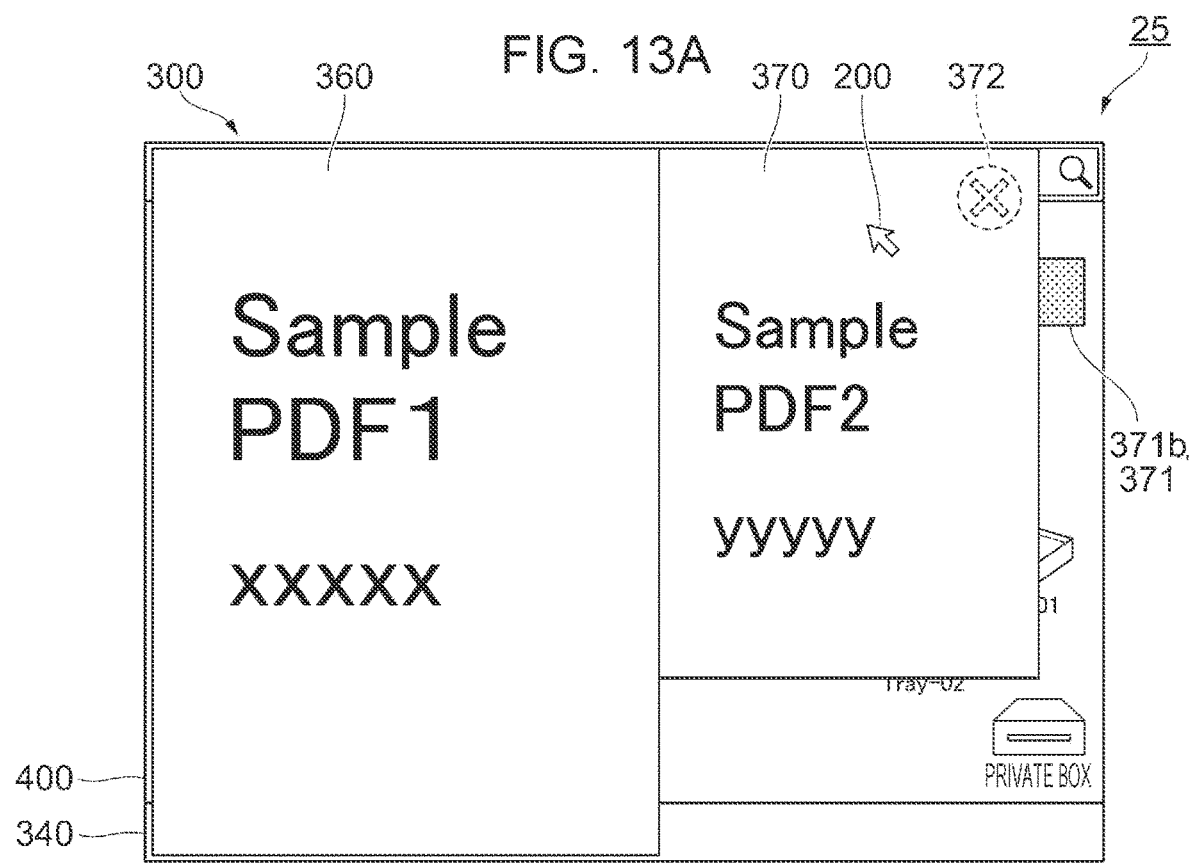
FIGS. 13A and 13B illustrate an example of a non-display button image according to this exemplary embodiment, FIG. 13A illustrating a case where the non-display button image is not designated by the user, FIG. 13B illustrating a case where the non-display button image is designated by the user.
Figure 13B:
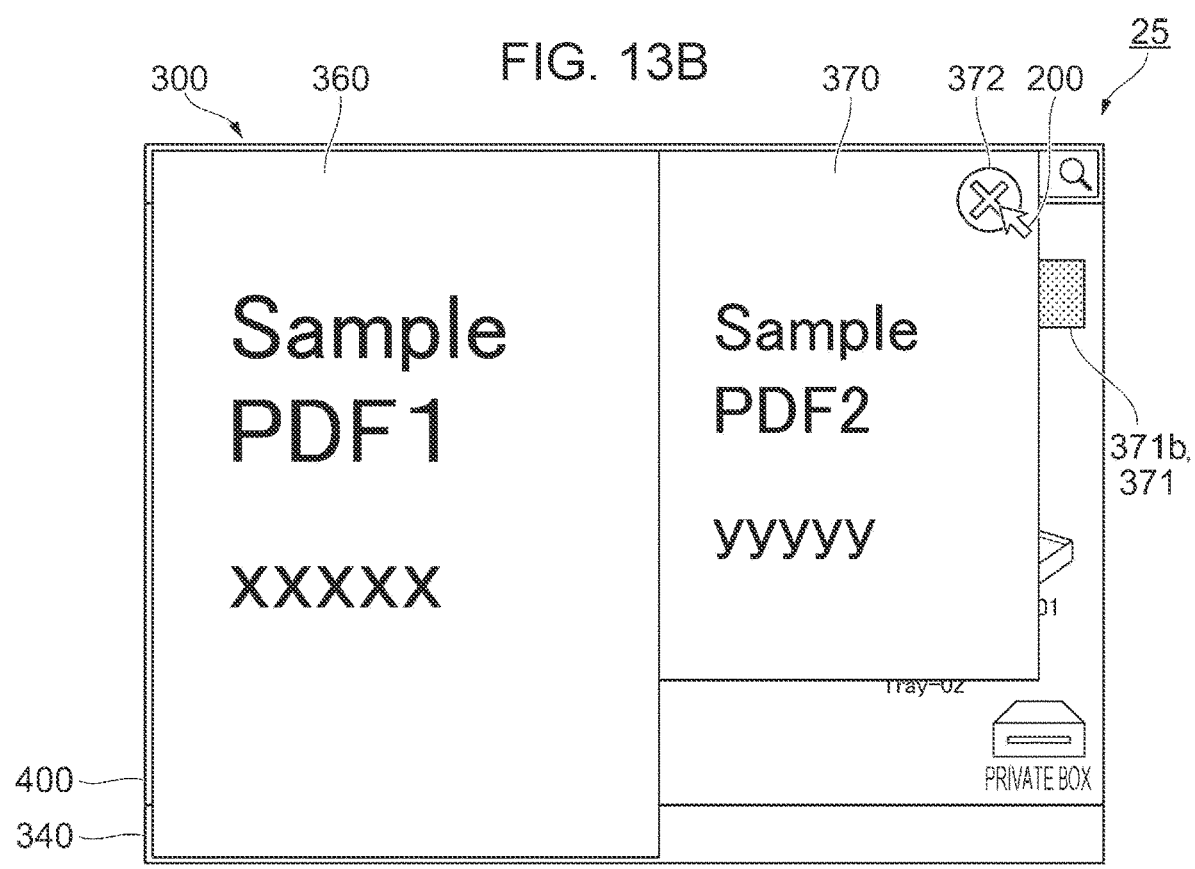

FIGS. 13A and 13B illustrate an example of a non-display button image 372 according to this exemplary embodiment. Specifically, FIG. 13A illustrates a case where the non-display button image 372 is not designated by the user, and FIG. 13B illustrates a case where the non-display button image 372 is designated by the user.

In this exemplary embodiment, as described above, when the user specifies a second file, the enlarged image 360 and the corresponding image 370 are displayed on the operation screen 300. Furthermore, as described above, the user selects any of the correspondence command images 371 to switch the display of the corresponding image 370.

The non-display button image 372 (see FIG. 13A) according to this exemplary embodiment is an image that receives an operation performed by the user for setting the corresponding image 370 to a non-displayed state instead of switching the display of the corresponding image 370.

In this exemplary embodiment, when the cursor 200 is positioned on the corresponding image 370, the non-display button image 372 is displayed, as shown in FIG. 13A. In other words, when the corresponding image 370 is designated by the user, the non-display button image 372 is displayed.

On the other hand, in this exemplary embodiment, in a state where the cursor 200 is positioned on the enlarged image 360, the non-display button image 372 is not displayed.

In the display example in FIG. 13A, the non-display button image 372 is displayed where it is less likely to interfere with the visibility of the corresponding image 370.

In detail, the non-display button image 372 is displayed in a region of the corresponding image 370 located toward an edge of the corresponding image 370. More specifically, the non-display button image 372 is displayed over an upper right region of the corresponding image 370.

Alternatively, the non-display button image 372 may be displayed where it does not overlap the corresponding image 370.

The display size of the non-display button image 372 is not particularly limited and may be smaller than that of the selected icon 310S (see FIG. 4) corresponding to the first file from the standpoint of reducing interference with the visibility of the corresponding image 370.

The display size and the shape of the non-display button image 372 may be changed, where appropriate, in accordance with the display size and the shape of the operation screen 300 or the corresponding image 370.

In the display example in FIG. 13A, the cursor 200 is positioned on the corresponding image 370 but has not reached the region where the non-display button image 372 is displayed.

In other words, in FIG. 13A, the corresponding image 370 is designated by the user, whereas the non-display button image 372 is not designated by the user.

In this state, in this exemplary embodiment, the non-display button image 372 is made semi-transparent by increasing the transparency thereof, and the corresponding image 370 is displayed such that an area thereof that overlaps the non-display button image 372 is transparently visible.

In the display example in FIG. 13B, the cursor 200 is positioned on the corresponding image 370 and is also positioned on the non-display button image 372.

In other words, in FIG. 13B, the non-display button image 372 is designated by the user.

In this state, a process for reducing the transparency of the non-display button image 372 is performed.

Accordingly, the non-display button image 372 is displayed in a more clearly visible manner.

In this exemplary embodiment, the enlarged image 360 is maintained in a displayed state even when the user selects the non-display button image 372 shown in FIG. 13B to set the corresponding image 370 to a non-displayed state.

Furthermore, when the user selects the non-display button image 372 shown in FIG. 13B to set the corresponding image 370 to a non-displayed state, the enlarged image 360 is displayed toward the middle of the operation screen 300, as shown in FIG. 4.

In other words, in this exemplary embodiment, in a case where the corresponding image 370 displayed on the operation screen 300 is set to a non-displayed state, the display position of the enlarged image 360 is returned to the position (see FIG. 4) prior to the movement of the enlarged image 360 to the position shown in FIG. 13B.

Figure 14A:
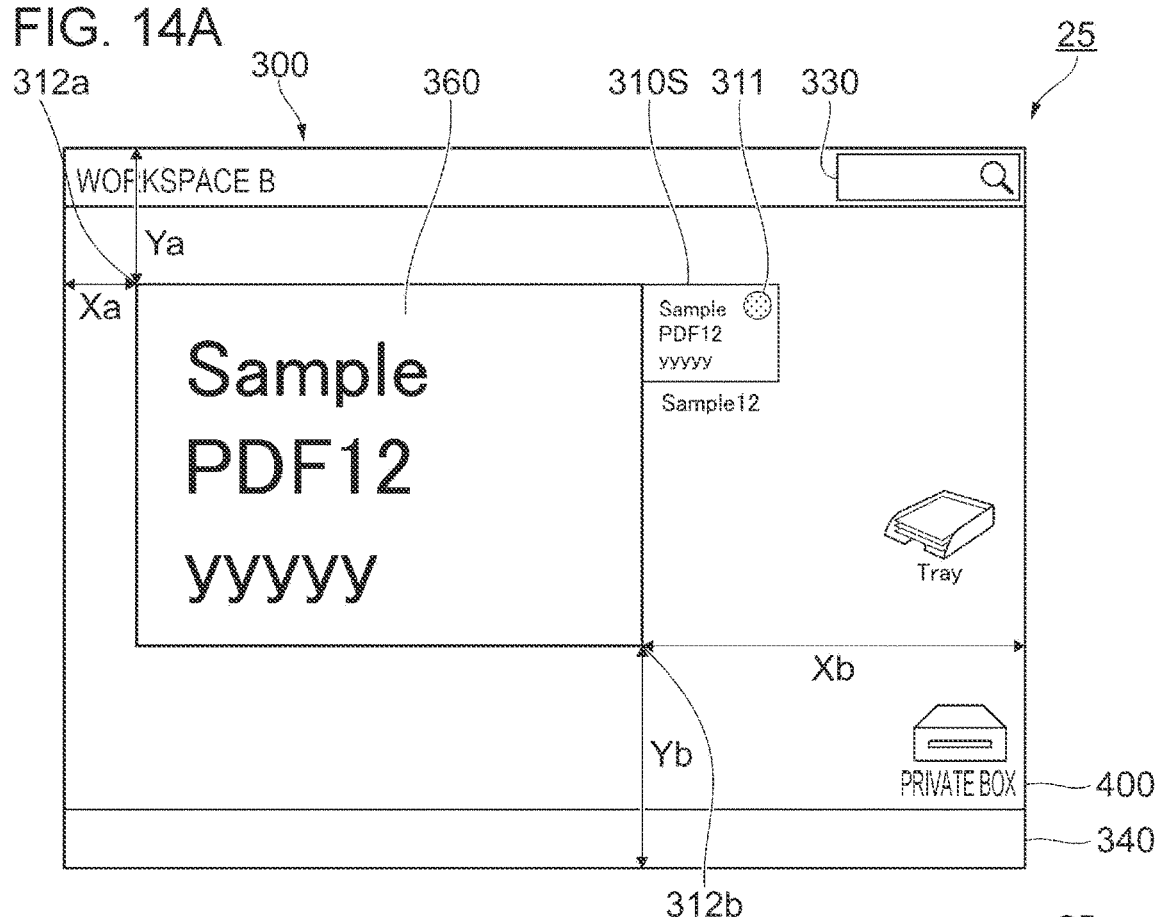
FIGS. 14A and 14B illustrate another display example of the operation screen according to this exemplary embodiment, FIG. 14A illustrating a margin existing around the enlarged image, FIG. 14B illustrating a corresponding image displayed in the margin.
Figure 14B:

FIGS. 14A and 14B illustrate another display example of the operation screen 300 according to this exemplary embodiment.

In the above example, when the display position of the enlarged image 360 is to be changed depending on whether or not the first and second files are to be compared with each other, more specifically, when the corresponding image 370 corresponding to the second file is not to be displayed, the enlarged image 360 is displayed toward the middle of the operation screen 300, as shown in FIG. 4.

Moreover, in the above example, when the corresponding image 370 corresponding to the second file is to be displayed, the enlarged image 360 is displayed toward an edge of the operation screen 300 so that the display position of the enlarged image 360 is changed, as shown in FIG. 7A.

Alternatively, the display position of the enlarged image 360 may be a single specific location around the selected icon 310S.

In the case where the display position of the enlarged image 360 is a single specific location, when the corresponding image 370 is to be displayed, for example, the corresponding image 370 is displayed in a margin area of the operation screen 300 where the enlarged image 360 is not displayed.

Furthermore, from the standpoint of increasing the display size of the corresponding image 370, the corresponding image 370 may be displayed where the margin is large.

The following description relates to a process example in which the corresponding image 370 is displayed where the margin is large.

FIG. 14A illustrates a margin existing around the enlarged image 360.

In the display example in FIG. 14A, the enlarged image 360 corresponding to the selected icon 310S is displayed on the "workspace B".

In this display example, the display position of the enlarged image 360 is set in accordance with the display position of the selected icon 310S selected by the user. In detail, for example, as shown in FIG. 14A, the display position of the enlarged image 360 is located adjacent to the selected icon 310S selected by the user.

As shown in FIG. 14A, the distance from a reference position 312a at the upper left corner of the enlarged image 360 to the left edge of the operation screen 300 will be defined as Xa, and the distance to the upper edge will be defined as Ya. The distance from a reference position 312b at the lower right corner of the enlarged image 360 to the right edge of the operation screen 300 will be defined as Xb, and the distance to the lower edge will be defined as Yb. The distances Xa, Xb, Ya, and Yb are proportional to the dimensions of the margin existing around the enlarged image 360.

In this exemplary embodiment, information about each of the distances Xa, Xb, Ya, and Yb is acquired.

In this exemplary embodiment, the display position of the corresponding image 370 is set based on the information about each of the distances Xa, Xb, Ya, and Yb.

In other words, in this exemplary embodiment, the display position of the corresponding image 370 is set based on the dimensions of the margin existing around the enlarged image 360.

When the distances Xa and Xb shown in FIG. 14A are compared with each other, the distance Xb is greater than the distance Xa. In this case, in this exemplary embodiment, it is determined that the margin located to the right of the enlarged image 360 is larger than the margin located to the left of the enlarged image 360.

In this case, the display position of the corresponding image 370 is set to the right of the enlarged image 360, such that the corresponding image 370 is displayed at the right side of the enlarged image 360, as in FIG. 14B.

As shown in FIG. 14B, instead of arranging the corresponding image 370 and the enlarged image 360 in the horizontal direction, the corresponding image 370 and the enlarged image 360 may be arranged in the vertical direction.

In this case, the distances Ya and Yb shown in FIG. 14A are compared with each other.

In this display example, the distance Yb is greater than the distance Ya. In this case, it is determined that the margin located below the enlarged image 360 is larger than the margin located above the enlarged image 360.

In this case, the display position of the corresponding image 370 is set below the enlarged image 360, such that the corresponding image 370 is displayed below the enlarged image 360.

With the corresponding image 370 being displayed where the margin existing around the enlarged image 360 is large, the display size of the corresponding image 370 is increased.

Figure 15:
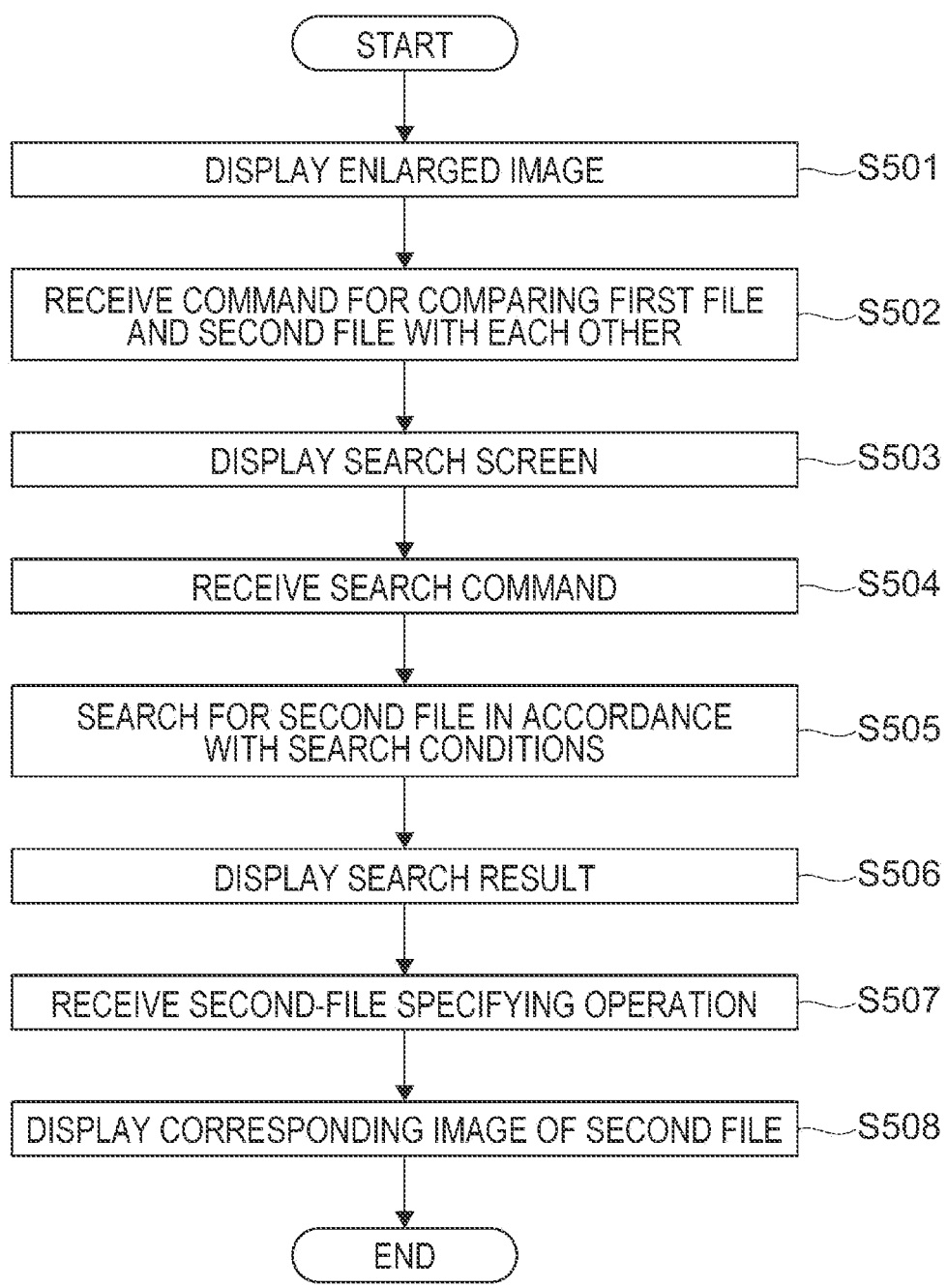
FIG. 15 is a flowchart illustrating the flow of a process for displaying a corresponding image corresponding to the second file specified in accordance with a searching process performed by the user.

Next, the flow of the above-described process will be described with reference to FIG. 15. This example corresponds to a case where the user uses the input unit 24, such as a mouse device. Furthermore, the flow of the process in FIG. 15 corresponds to a case where the corresponding image 370 corresponding to the second file specified in accordance with the searching process performed by the user is displayed.

In this exemplary embodiment, in step S501, the terminal apparatus 20 first displays the enlarged image 360 based on a user operation performed via the input unit 24.

In detail, the terminal apparatus 20 determines whether or not the user has performed an operation on the enlargement command image 311 displayed in the selected icon 310S (see FIG. 4), and receives a command for displaying the enlarged image 360 if this operation has been performed.

If there is a command for displaying the enlarged image 360, the terminal apparatus 20 displays the enlarged image 360, as described above.

Subsequently, in step S502, the terminal apparatus 20 receives a command for comparing the first file corresponding to the enlarged image 360 and the second file with each other based on a user operation performed via the input unit 24.

In detail, the terminal apparatus 20 determines whether or not the user has performed an operation on the comparison command image 381 (see FIG. 5B). If this operation has been performed, the command for comparing the first file and the second file with each other is received.

In step S503, the terminal apparatus 20 displays the search screen 350 (see FIG. 6) on the operation screen 300 displayed on the display 25.

Then, in step S504, the terminal apparatus 20 receives a search command from the user via the displayed search screen 350 (see FIG. 6). In other words, the terminal apparatus 20 receives, from the user, search conditions for the second file to be displayed as the corresponding image 370.

Subsequently, in step S505, the server apparatus 10 searches for the second file in accordance with the received search conditions.

The server apparatus 10 searches for the second file from, for example, files stored in the server apparatus 10 in accordance with the search conditions.

Instead of being targeted to all the files stored in the server apparatus 10, the search for the second file may be targeted to a file or files that the user is authorized to browse.

Subsequently, the server apparatus 10 transmits the search result to the terminal apparatus 20.

In step S506, the terminal apparatus 20 displays the search result from the server apparatus 10 on the search screen 350. In detail, as shown in FIG. 6, the terminal apparatus 20 displays the filename of the second file included in the search result on the search screen 350.

In addition to the filename, the terminal apparatus 20 may display, for example, a graphic symbol indicating the file type, an editor of the file, and the file storage location on the search screen 350.

Subsequently, in step S507, the terminal apparatus 20 receives a second-file specifying operation performed by the user based on a user operation performed via the input unit 24.

In this exemplary embodiment, selection of any of the checkboxes 353a (see FIG. 6) in the specification field 353 on the search screen 350 corresponds to the second-file specifying operation.

Then, the terminal apparatus 20 makes a request for file information to the server apparatus 10, and acquires the file information about the second file from the server apparatus 10.

If the file information about the second file specified by the user is already stored in the terminal apparatus 20, the terminal apparatus 20 does not have to make a request for the file information to the server apparatus 10.

The request destination or the acquisition destination of the file information is not limited to the server apparatus 10 and may be another apparatus different from the server apparatus 10.

Subsequently, in step S508, the terminal apparatus 20 displays the corresponding image 370 corresponding to the second file specified by the user in a state where the enlarged image 360 is displayed.

More specifically, the terminal apparatus 20 sets the search screen 350 to a non-displayed state while the enlarged image 360 is in a displayed state, and displays the corresponding image 370 corresponding to the second file specified in accordance with the searching process performed by the user.

As an alternative to the configuration in the above-described example, the process performed by the server apparatus 10 may be performed by the terminal apparatus 20.

For example, each terminal apparatus 20 may perform the searching process for the second file.

In this exemplary embodiment, the programs to be executed by the CPU 11a (see FIG. 2) and the CPU 21a (see FIG. 3) serving as examples of processors may be provided to the arithmetic units 11 and 21 by being stored in a computer-readable storage medium, such as a magnetic storage medium (e.g., magnetic tape or a magnetic disk), an optical storage medium (e.g., an optical disk), a magneto-optical storage medium, or a semiconductor memory. Alternatively, the programs to be executed by the CPUs 11a and 21a may be downloaded to the server apparatus 10 and the terminal apparatus 20 by using a communication unit, such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The process performed by the information processing system 1 according to this exemplary embodiment is prepared as a program, such as application software. This program may be provided by a communication unit or may be provided by being stored in a storage medium, such as a compact disc read-only memory (CD-ROM).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor configured to:
cause a display to display an enlarged image corresponding to a file image in a case where the file image displayed on the display and serving as an image corresponding to a first file is selected by a user, the enlarged image having a display size larger than a display size of the file image;
acquire file information about a second file that is different from the first file and that is specified in accordance with a searching process performed by the user in a state where the enlarged image is displayed on the display, wherein the searching process is performed by input of text by the user; and
cause the display to display a corresponding image corresponding to the second file and the enlarged image in a state where the corresponding image and the enlarged image have a predetermined positional relationship, the corresponding image having a display size larger than the display size of the file image.

2. The information processing system according to claim 1, wherein the processor is configured to cause the display to display the enlarged image and the corresponding image without overlapping each other.

3. The information processing system according to claim 1, wherein the processor is configured to set a display position of the enlarged image toward an edge of the display.

4. The information processing system according to claim 2, wherein the processor is configured to set a display position of the enlarged image toward an edge of the display.

5. The information processing system according to claim 1, wherein the processor is configured to move the enlarged image in a case where the file information is acquired and the corresponding image is to be displayed.

6. The information processing system according to claim 2, wherein the processor is configured to move the enlarged image in a case where the file information is acquired and the corresponding image is to be displayed.

7. The information processing system according to claim 5, wherein the processor is configured to move the enlarged image toward an edge of the display in a case where the file information is acquired and the corresponding image is to be displayed.

8. The information processing system according to claim 5, wherein the processor is configured to return a display position of the enlarged image to a position prior to the movement of the enlarged image if the corresponding image displayed on the display is set to a non-displayed state.

9. The information processing system according to claim 1, wherein the processor is configured to move the enlarged image when a search screen that receives the searching process by the user is to be displayed on the display.

10. The information processing system according to claim 1, wherein the processor is configured to display the corresponding image in a margin area of the display where the enlarged image is not displayed.

11. The information processing system according to claim 1, wherein the processor is configured to cause the display to display a plurality of the corresponding images when the enlarged image is to be displayed on the display in a case where a plurality of pieces of the file information are acquired, the plurality of corresponding images respectively corresponding to the plurality of pieces of file information.

12. The information processing system according to claim 11, wherein the processor is configured to cause the display to display all of the plurality of corresponding images.

13. The information processing system according to claim 11, wherein the processor is configured to switch the display, if the plurality of corresponding images exist, such that only a part of the corresponding image included in the plurality of corresponding images is displayed simultaneously with the enlarged image.

14. The information processing system according to claim 13, wherein the processor is configured to not include the enlarged image as a switching target of the display and maintain the enlarged image in a displayed state.

15. The information processing system according to claim 11, wherein the processor is configured to cause the display to not display the enlarged image and to display the plurality of corresponding images if the user specifies a plurality of the second files and acquires a plurality of pieces of the file information and if a predetermined condition is satisfied.

16. The information processing system according to claim 1, wherein the processor is configured to set the corresponding image to a non-displayed state in a case where the enlarged image displayed on the display is set to a non-displayed state while the corresponding image is displayed on the display.

17. The information processing system according to claim 16, wherein the processor is configured to maintain the enlarged image in a displayed state in a case where the corresponding image displayed on the display is set to a non-displayed state.

18. The information processing system according to claim 1, wherein the processor is configured to cause the display to display information indicating a storage destination of the second file specified in accordance with the searching process by the user.

19. A non-transitory computer readable medium storing a program causing a computer to execute a process, the process comprising:
causing a display to display an enlarged image corresponding to a file image in a case where the file image displayed on the display and serving as an image corresponding to a first file is selected by a user, the enlarged image having a display size larger than a display size of the file image;
acquiring file information about a second file that is different from the first file and that is specified in accordance with a searching process performed by the user in a state where the enlarged image is displayed on the display, wherein the searching process is performed by input of text by the user; and
causing the display to display a corresponding image corresponding to the second file and the enlarged image in a state where the corresponding image and the enlarged image have a predetermined positional relationship, the corresponding image having a display size larger than the display size of the file image.

20. An information processing method comprising:
- causing a display to display an enlarged image corresponding to a file image in a case where the file image displayed on the display and serving as an image corresponding to a first file is selected by a user, the enlarged image having a display size larger than a display size of the file image;
- acquiring file information about a second file that is different from the first file and that is specified in accordance with a searching process performed by the user in a state where the enlarged image is displayed on the display, wherein the searching process is performed by input of text by the user; and
- causing the display to display a corresponding image corresponding to the second file and the enlarged image in a state where the corresponding image and the enlarged image have a predetermined positional relationship, the corresponding image having a display size larger than the display size of the file image.

* * * * *